United States Patent
Patel et al.

(10) Patent No.: US 7,375,873 B2
(45) Date of Patent: *May 20, 2008

(54) METHOD OF REPAIRING MICROMIRRORS IN SPATIAL LIGHT MODULATORS

(75) Inventors: Satyadev Patel, Sunnyvale, CA (US); James Dunphy, San Jose, CA (US); Peter Richards, San Francisco, CA (US); Michel Combes, Santa Cruz, CA (US)

(73) Assignee: Texas Instruments Incorporated, Dallas, TX (US)

( * ) Notice: Subject to any disclaimer, the term of this patent is extended or adjusted under 35 U.S.C. 154(b) by 51 days.

This patent is subject to a terminal disclaimer.

(21) Appl. No.: 11/069,408

(22) Filed: Feb. 28, 2005

(65) Prior Publication Data

US 2006/0193029 A1    Aug. 31, 2006

(51) Int. Cl.
G02B 26/00 (2006.01)

(52) U.S. Cl. .................. 359/291; 359/290; 359/223; 359/295

(58) Field of Classification Search ............ 359/290, 359/291, 292, 295, 223
See application file for complete search history.

(56) References Cited

U.S. PATENT DOCUMENTS

| | | | |
|---|---|---|---|
| 3,553,364 A | 1/1971 | Lee et al. | |
| 4,112,575 A | 9/1978 | Fu et al. | |
| 4,164,751 A | 8/1979 | Tasch, Jr. | |
| 4,229,732 A | 10/1980 | Hartstein et al. | |
| 4,356,730 A | 11/1982 | Cade | |
| 4,468,663 A | 8/1984 | Kalt | |
| 4,470,667 A | 9/1984 | Okubo et al. | |
| 4,566,935 A | 1/1986 | Hornbeck | |
| 4,615,595 A | 10/1986 | Hornbeck | |
| 4,680,579 A | 7/1987 | Ott | |
| 4,888,616 A | 12/1989 | Nanamura et al. | |
| 5,096,279 A | 3/1992 | Hornbeck | |
| 5,382,961 A | 1/1995 | Gale, Jr. | |
| 5,583,688 A * | 12/1996 | Hornbeck | 359/291 |
| 5,768,007 A | 6/1998 | Knipe et al. | |
| 6,147,790 A | 11/2000 | Meier et al. | |
| 6,285,490 B1 | 9/2001 | Meier et al. | |
| 6,348,907 B1 | 2/2002 | Wood | |
| 6,388,661 B1 | 5/2002 | Richards | |
| 6,775,174 B2 | 8/2004 | Huffman et al. | |
| 6,819,470 B2 | 11/2004 | Meier et al. | |
| 7,253,794 B2 * | 8/2007 | Wood | 345/84 |
| 2002/0085437 A1 | 7/2002 | Huffman et al. | |
| 2002/0093721 A1 | 7/2002 | Knipe | |

(Continued)

OTHER PUBLICATIONS

US 6,724,518, 04/2004, Meyer et al. (withdrawn)

*Primary Examiner*—Jessica T Stultz
(74) *Attorney, Agent, or Firm*—W. James Brady, III; Frederick J. Telecky, Jr.

(57) ABSTRACT

Disclosed herein is method of operating a device that comprises an array of micromirrors. The method comprises a process usable for repairing stuck micromirrors of the micromirror array during the operation. The reparation process applies, at the ON state, two consecutive refresh voltages to the mirror plates of the micromirrors in the array with the pulses being separated in time longer than the characteristic oscillation time of the micromirrors. The reparation process can be applied independently to the micromirrors. Alternatively, the reparation process can be incorporated with a bias inversion process.

20 Claims, 13 Drawing Sheets

U.S. PATENT DOCUMENTS

| | | |
|---|---|---|
| 2003/0117686 A1 | 6/2003 | DiCarlo |
| 2003/0117688 A1 | 6/2003 | Meier et al. |
| 2003/0137215 A1* | 7/2003 | Cabuz ........................ 310/309 |
| 2003/0137501 A1 | 7/2003 | Richards |
| 2003/0160540 A1 | 8/2003 | Miller et al. |
| 2004/0196722 A1 | 10/2004 | Richards |
| 2004/0263430 A1* | 12/2004 | Richards ...................... 345/32 |
| 2005/0030609 A1 | 2/2005 | Hewlett et al. |
| 2005/0078379 A1* | 4/2005 | Huibers et al. ............. 359/634 |
| 2005/0243404 A1 | 11/2005 | Knipe |
| 2006/0193028 A1* | 8/2006 | Patel et al. ................. 359/290 |

* cited by examiner $$V_{out} = \begin{cases} V_{B+}, & B = 0 \\ V_{B-}, & B = V_{DD} \end{cases}$$

METHOD OF REPAIRING MICROMIRRORS IN SPATIAL LIGHT MODULATORS

TECHNICAL FIELD OF THE INVENTION

The present invention is related generally to the art of spatial light modulators having micromirror arrays, and more particularly, to a method and an apparatus for operating the micromirror array of the spatial light modulator in producing videos.

BACKGROUND OF THE INVENTION

Microstructures, such as micromirror devices, have found many applications in basic signal transduction. For example, a spatial light modulator based on micromirror device steers light in response to electrical or optical signals. Such a modulator can be a part of a communication device or an information display.

A major factor that limits the reliability and widespread use of micromirror devices is adhesion. Adhesion is a result of the dominance of surface and interfacial forces, such as capillary, chemical bonding, electrostatic, and van der Waals forces, over mechanical forces which tend to separate micromirror device components. When mechanical restoring forces cannot overcome adhesive forces, the micromirror devices are said to suffer from stiction. Stiction failures in contacting micromirror devices, can occur after the first contacting event (often referred to as initial stiction), or as a result of repeated contacting events (often referred to as in-use stiction). Initial stiction is often associated with surface contamination (e.g., residues of bonding materials or photoresist), or with high energy of contacting surfaces (e.g., clean oxidized silicon or metallic surfaces). For the case of in-use stiction, each time one part of the micromirror (e.g. mirror plate of a micromirror device) touches the other (e.g. stopping mechanism) or the substrate, the contact force grows and ultimately becomes too large for the restoring force to overcome. In this case, the device remains in one state indefinitely. This phenomenon can arise from a variety of underlying mechanisms, such as contact area growth, creation of high-energy surface by micro-wear, surface charge separation etc.

The stiction of the micromirrors often exhibits dynamic characters. For example, the stiction in a micromirror can vary over time, and the restoration force necessary to overcome the stiction in the same micromirror may also vary over time. In a micromirror array device, such as a micromirror-based spatial light modulator, the stiction may occur in different micromirrors at different times in operation. Such stiction in individual micromirrors may also vary over time.

Therefore, what is needed is a method and apparatus for repairing the stuck micromirrors.

SUMMARY OF THE INVENTION

In view of the foregoing, the present invention provides a method and apparatus for repairing the stuck micromirrors with refresh voltage pulses. The reparation can be performed dynamically during operation of the micromirrors. Alternatively, it can be performed when the micromirrors are not in operation. Such objects of the invention are achieved in the features of the independent claims attached hereto. Preferred embodiments are characterized in the dependent claims.

In an embodiment of the invention, a method of operating an array of micromirrors in displaying a video comprising a set of frames, wherein each micromirror comprises a deflectable mirror plate and an addressing electrode associated with the mirror plate is disclosed. The method comprises: switching the micromirrors between an ON and OFF state during a sequence of frame periods corresponding to the frames; and performing a reparation process within a frame period of the sequence of frame periods, wherein the reparation process comprises: turning the micromirrors of the array to the OFF state; and applying first and second refresh voltage pulses to the mirror plates of the micromirrors in the array, wherein the refresh voltage pulses are separated in time longer than a characteristic oscillation time of the micromirrors.

In another embodiment of the invention, a method is disclosed. The method comprises: illuminating an array of micromirrors with an illumination light, wherein each micromirror comprises a reflective deflectable mirror plate and an addressing electrode associated with the mirror plate for deflecting the mirror plate; operating the micromirrors according to a method that comprises; switching the micromirrors between an ON and OFF state during a sequence of frame periods corresponding to the frames; and performing a reparation process within a frame period of the sequence of frame periods, wherein the reparation process comprises; turning the micromirrors of the array to the OFF state; and applying first and second refresh voltage pulses to the mirror plates of the micromirrors in the array, wherein the refresh voltage pulses are separated in time longer than a characteristic oscillation time of the micromirrors; and projecting the reflected illumination light from the deflected micromirrors onto a display target so as to produce the desired video.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

Figure 1:
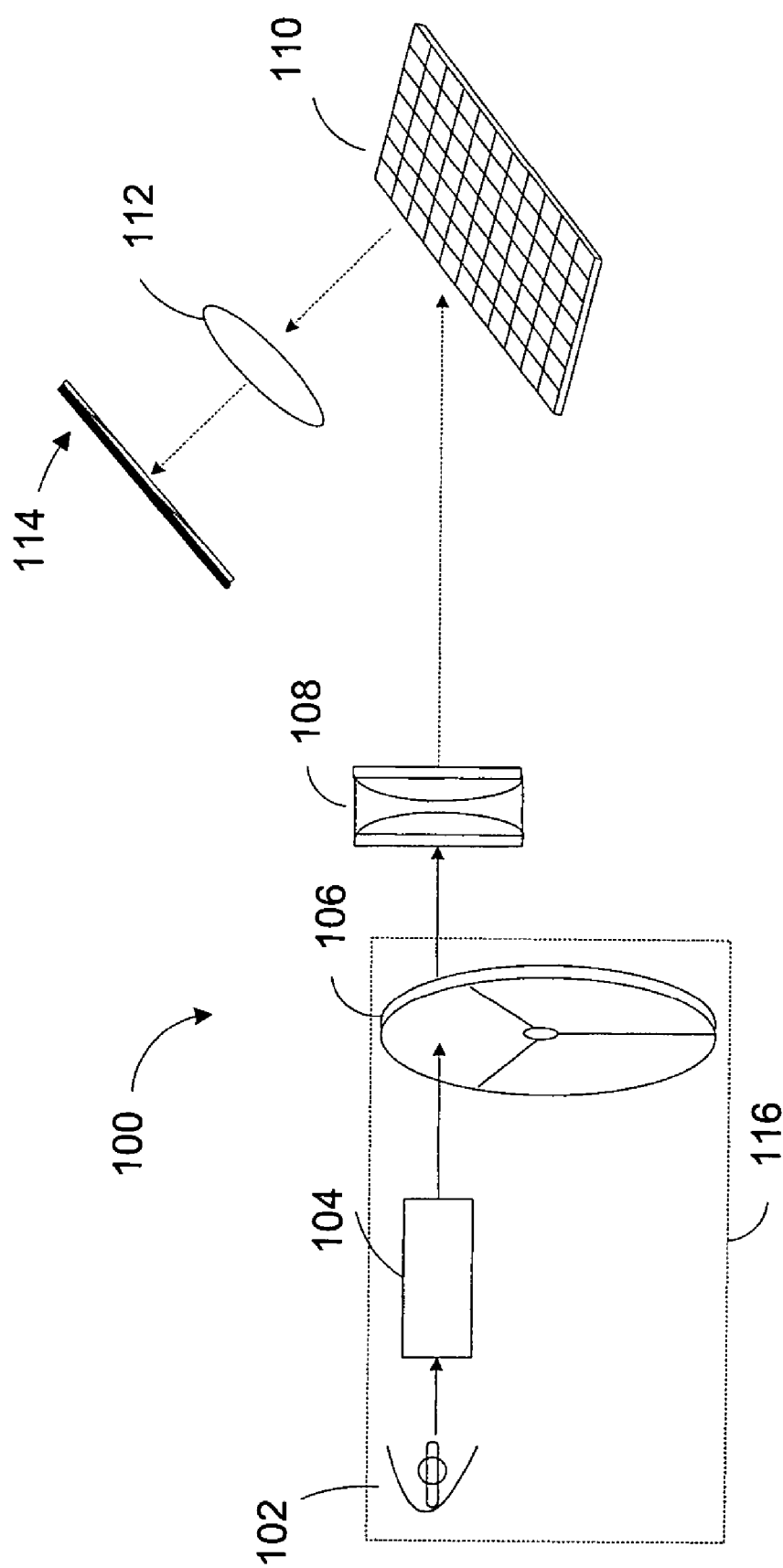
FIG. 1 illustrates an exemplary display system employing a spatial light modulator having an array of micromirrors in which embodiments of the invention can be implemented.

In order to repair the stuck micromirrors, refresh pulses are applied to the micromirrors so as to produce additional mechanical restoration forces in the micromirrors. The additional mechanical restoration force is added to the restoration force in the micromirrors so as to enhance the restoration force.

In the instance of operating an array of micromirrors, reparation procedures are initiated according to a predetermined schedule. In each reparation procedure, voltages of the micromirrors of the array are set to values such that the micromirrors are expected to be at the OFF state. Refresh voltage pulses are then applied to the micromirrors of the array. In the presence and after the application of the refresh voltage pulse, the micromirrors at the OFF state are not affected, and maintain their positions at the OFF state. However, the stuck micromirrors due to the in-site stiction are further deflected so as to produce additional deformation, under which additional mechanical restoration energy can be derived. The additional restoration energy is added to the stored restoration energy in the micromirrors and thus, helping to drive these stuck micromirrors to the OFF state.

For liberating all stuck micromirrors, the refresh voltage pulses applied each time preferably comprise two consecutive pulses with the time interval therebetween is longer than the intrinsic time period of the micromirrors, such as the reciprocal of the resonant frequency of the micromirrors. Of course, the time interval between the two consecutive refresh voltage pulses can be shorter than the intrinsic time period of the micromirrors. The reparation procedure can be carried out during each frame period. Alternatively, it can be performed at any predetermined time period.

The reparation procedure can be incorporated with other procedures, such as bias inversion that is performed primarily for eliminating static charge accumulation. For example, the polarity of the bias voltage (the voltage of the deflectable mirror plate) can be inversed at predetermined times during operation so as to dynamically eliminate accumulated static charge in the micromirror. During the course of the bias voltage inversion, first refresh voltage pulse can be applied so as to liberate the stuck micromirrors from stiction followed by the application of the second refresh voltage pulse. The two refresh voltage pulses preferably have opposite polarities, and have a time interval therebetween of longer than the intrinsic time (e.g. the reciprocal of the resonant frequency) of the micromirrors but shorter than the time to complete the inversion.

In the following, embodiments of the present invention will be illustrated with particular examples wherein the micromirrors are members of spatial light modulators in display systems. However, it will be immediately understood by those skilled in the art that the following examples are for demonstration purposes only, and it will not be interpreted as a limitation. Instead, any variations without departing from the spirit of the invention are also applicable. For example, the present invention can also be applied to other type of microelectromechanical devices in which in-site stiction may occur, such as micromirrors in optical switches.

Turning to the drawings, an exemplary micromirror based display system is illustrated in FIG. 1. In its basic configuration, display system 100 comprises illumination system 116 for producing sequential color light, spatial light modulator 110, optical element 108 for directing illumination light from the illumination system onto the spatial light modulator, and optical element 112 that projects the reflected illumination light onto display target 114.

Illumination system 116 further comprises light source 102, which can be an arc lamp, lightpipe 104 that can be any suitable integrator of light or light beam shape changer, and color filter 106, which can be a color wheel. The filter in this particular example is positioned after light pipe 104 at the propagation path of the illumination light. In another example, the color filter can be positioned between the light source and light pipe 104, which is not shown in the figure.

The present invention is also applicable to other micromirror based display systems, such as a display system employing more than one spatial light modulator of micromirrors. For example, a display system may employ three separate micromirror based spatial light modulators with each being designated for modulating a primary color. The modulated primary colors are then combined together to produce full color image or video.

Figure 2:
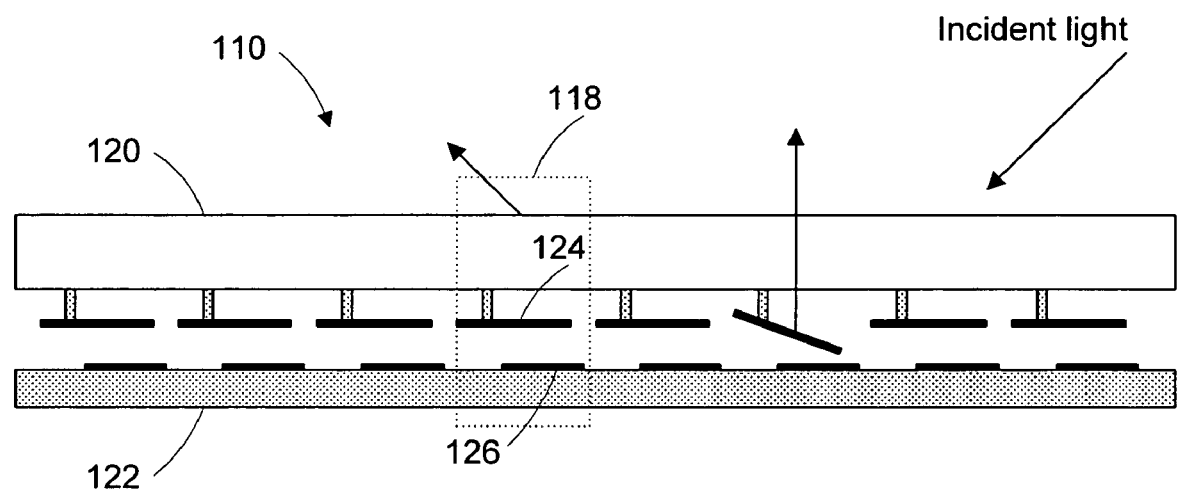
FIG. 2 illustrates a cross-section of a portion of the spatial light modulator in FIG. 1.

FIG. 2 illustrates a cross-section view of an exemplary spatial light modulator in FIG. 1. For simplicity purposes, only eight micromirror devices are illustrated therein. In general, the micromirror array of a spatial light modulator consists of thousands or millions of micromirrors, the total number of which determines the resolution of the displayed images. For example, the micromirror array of the spatial light modulator may have 1024×768, 1280×720, 1400× 1050, 1600×1200, 1920×1080, or even larger number of micromirrors. In other applications, the micromirror array may have less number of micromirrors.

In this example, the array of deflectable reflective mirror plates (e.g. 124) is disposed between light transmissive substrate 120 and semiconductor substrate 122 having formed thereon an array of addressing electrodes (e.g. addressing electrode 126) each of which is associated with a mirror plate for electrostatically deflecting the mirror plate. In operation, the illumination light passes through the light transmissive substrate and illuminates the reflective surfaces of the mirror plates, from which the illumination light is modulated. The reflected illumination light from the mirror plates at the ON state is collected by the projection lens (e.g. projection lens 112 in FIG. 1) so as to generate a "bright" pixel in the display target (e.g. display target 114 in FIG. 1). The reflected illumination from the mirror plates at the OFF state travels away from the projection lens, resulting in the corresponding pixels in the display target to be "dark."

In an alternative configuration, the deflectable reflective mirror plates can be formed on the semiconductor substrate having the addressing electrode, in which instance, the light transmissive substrate may not be provided, which is not shown in the figure.

The micromirrors in the array can be arranged in many suitable ways. For example, the micromirrors can be arranged such that the center-to-center distance between the adjacent mirror plates can be 10.16 microns or less, such as 4.38 to 10.16 microns. The nearest distance between the edges of the mirror plate can be from 0.1 to 1.5 microns, such as from 0.15 to 0.45 micron, as set forth in U.S. patent application Ser. No. 10/627,302, Ser. No. 10/627,155, and Ser. No. 10/627,303, both to Patel, filed Jul. 24, 2003, the subject matter of each being incorporated herein by reference.

Figure 3:
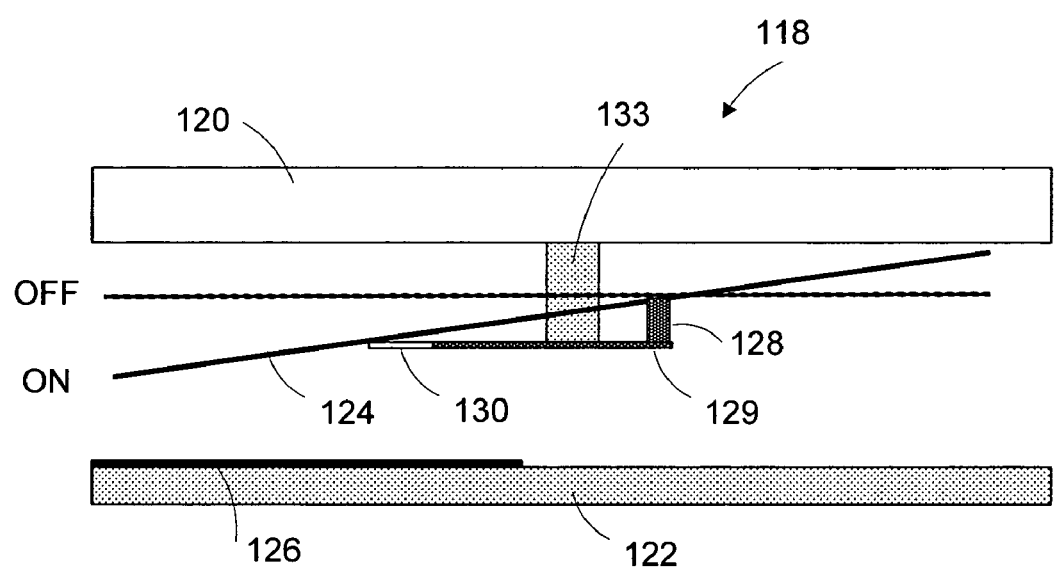
FIG. 3 illustrates a exploded cross-sectional view of a micromirror device in FIG. 2.

As a way of example, an exemplary micromirror in FIG. 2 is schematically illustrated in a cross-section view in FIG. 3. Referring to FIG. 3, micromirror 118 comprises deflectable mirror plate 124 having a reflective surface for reflecting the illumination light to be modulated. The mirror plate is attached to deformable hinge 129 (e.g. a torsion hinge) via hinge contact 128 with the deformable hinge being held and supported by post 133 on substrate 120 such that the mirror plate can be deflected (rotated) relative to the substrate. The deflection of the mirror plate is achieved by electrostatic field established between the mirror plate and addressing electrode 126. In accordance with an embodiment of the invention, only one addressing electrode is provided for the micromirror. Alternatively, multiple addressing electrodes can be provided for each micromirror. Stopper 130 is provided to limit the rotation of the mirror plate in accordance with the operation states, such as the ON state when the micromirror is operated in a binary mode including the ON and OFF state. The stopper 130 can be formed in many alternative ways, such as those set forth in U.S. patent application Ser. No. 10/437,776 filed Apr. 13, 2003 and Ser. No. 10/613,379 filed Jul. 3, 2003, Ser. No. 10/703,678 filed Nov. 7, 2003, the subject matter of each being incorporated herein by reference.

In operation, the mirror plate rotates towards the ON state position with the electrostatic field established between the mirror plate and addressing electrode. The rotation of the mirror plate is stopped by the stopper when the mirror plate arrives at the ON state angle, in which situation the mirror plate abuts against the stopper. During the rotation of the mirror plate to the ON state angle, the hinge is deformed, and restoration energy due to such deformation is stored in the hinge. When the OFF state is desired, the voltages of the mirror plate and the addressing electrode are reduced such that the resulted electrostatic field cannot balance the restoration energy stored in the deformable hinge. Therefore, the mirror plate departs from the ON position and returns to the OFF state.

However, the mirror plate may not be able to depart from the ON state when the restoration force can not overcome the surface force between the contact surfaces of the mirror plate and the stopper, even through the electrostatic field between the mirror plate and the addressing electrode is reduced to zero, in which situation the in-use stiction occurs. In order to liberate the stuck mirror plate from stiction, reparation process comprising refresh voltage pulses are performed with the voltage pulses being applied to the mirror plate so as to produce additional restoration energy. Specifically, refresh voltage pulses force the mirror plate to move towards the addressing electrode and thus, producing additional deformation in the deformable hinge. The additional deformation results in additional mechanical restoration energy that is added to and thus, enhancing the stored restoration energy in the hinge.

The refresh voltage pulse can be applied in many ways. As a way of example in a video display application wherein the video comprises a sequence of frames, one single refresh voltage pulse is applied in one frame period, as illustrated in FIG. 4*a*.

Figure 4A:
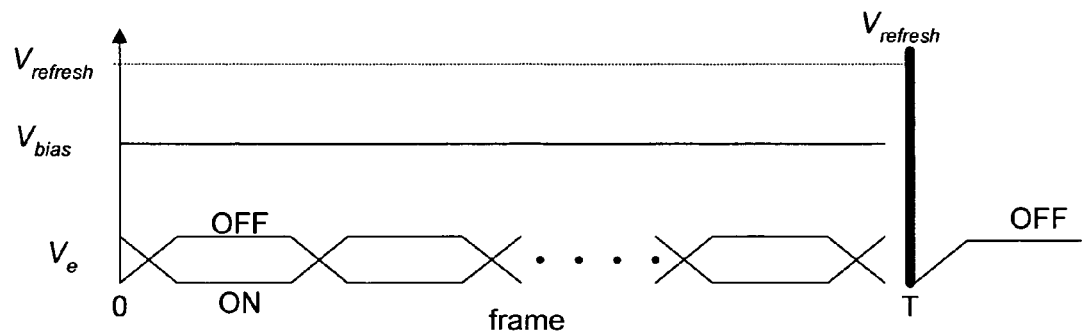
FIG. 4a diagrammatically plots voltages used in operating the micromirror device according to an embodiment of the invention.

Referring to FIG. 4*a*, during frame period (0, T), bias voltage $V_{bias}$ is applied to the mirror plate. Voltage $V_e$ on the addressing electrode (e.g. electrode 126 in FIG. 3) varies over time according to the image data (e.g. image data generated according to a pulse-width-modulation algorithm) so as to switch the mirror plate between the ON and OFF states. On or around the termination of the frame period T, refresh voltage pulse $V_{refresh}$, represented by the thick line, is added to the bias voltage $V_{bias}$. The peak value of the refresh pulse can be the same as, and is preferably 1.5 times or more, such as 2 times or more, 3 times or more, or 5 times or more, or 10 times or more of the amplitude of the bias voltage $V_{bias}$ before application of the refresh voltage. The duration of the refresh pulse can be 5 microseconds or less, such as 2 microseconds or less and 1 microsecond or less. The polarity of the refresh voltage pulse may or may not be the same as the polarity of the bias voltage immediately before the refresh pulse.

Figure 4B:
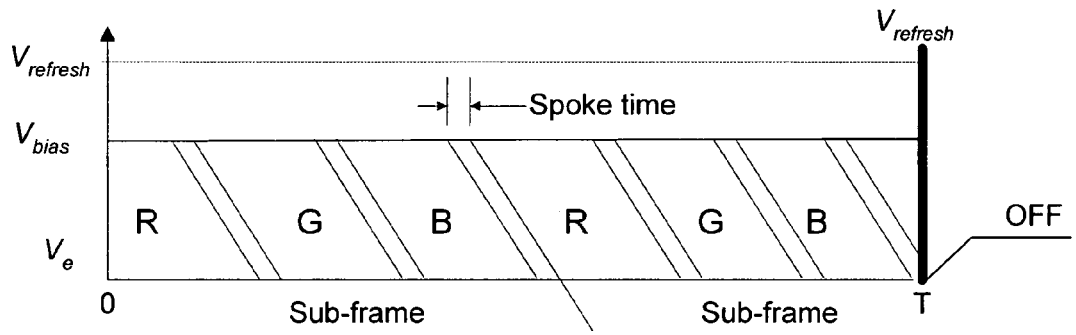
FIG. 4b diagrammatically plots voltages used in operating the micromirror device according to another embodiment of the invention.

In accordance with another embodiment of the invention, the reparation process comprising the refresh pulses can be applied during color fields, as shown in FIG. 4*b*. Referring to FIG. 4*b*, the frame has multiple color fields. The color fields are defined by the configuration of the color wheel as shown in FIG. 1, as set forth in U.S. patent application Ser. No. 10/899,635 filed Jul. 26, 2004, Ser. No. 10/899,637 filed Jul. 26, 2004, Ser. No. 10/771,231 filed Feb. 3, 2003, the subject matter of each being incorporated herein by reference.

For demonstration purposes only, FIG. 4*b* illustrates the color fields produced by a color wheel having red, green, and blue segments. The color wheel spins two rounds in a frame period. Accordingly, the frame has red, green, blue, red, green, and blue segments. The adjacent color fields have an intervening spoke filed that is associated with the transition of the color fields in the color wheel when the color is spinning. The frame period can be split into two consecutive sub-frames each of which comprises a red, green, and blue field, as shown in the figure. In the embodiment of the invention, the reparation process can be performed for each or selected color fields. Alternatively, the reparation can be performed during each or only selected sub-frames. The selections for the individual color fields or sub-frames for performing the reparation can be made according to a predefined criterion. For example, the selection can be every other color fields (or sub-frames), or every certain number of color fields (sub-frames), or random. In any situation, it is preferred that the refresh voltage pulses of the reparation processes are initiated and performed during the spoke periods so as to avoid losing optical efficiency of the display system. This arises from the fact that during the spoke periods, image data are not loaded to the micromirrors, and the micromirrors are "blanked" during the spoke periods.

In accordance with yet another embodiment of the invention, the reparation process can be performed such that the ratio of the total number switches of the micromirrors between the ON and OFF (i.e. from the ON to OFF and from OFF to ON) to the total number refresh voltage pulses applied to the micromirrors is greater than 1, such as greater than 2, or 3, or 4.

Figure 5A:
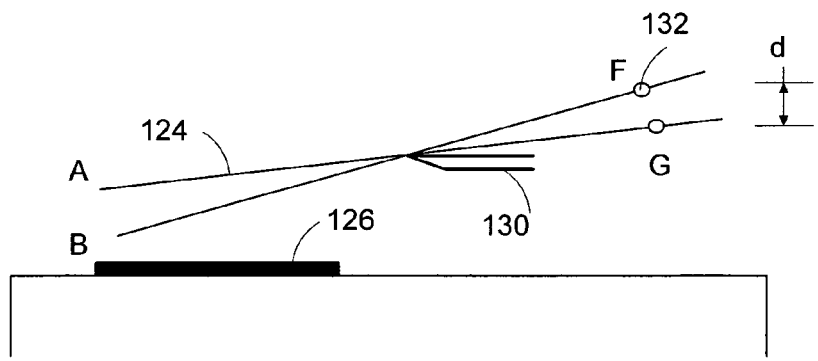
FIG. 5a illustrates, in cross-section view, the micromirror with the voltages as plotted in FIG. 4.
Figure 5B:
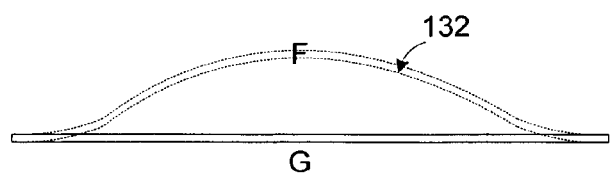
FIG. 5b schematically illustrates the status of the deformable hinge of the micromirror before and after the application of the refresh voltage pulse.

Referring to FIG. 5a, mirror plate 124 is at the ON state with deformable hinge 132 at position F in the presence of the bias voltage $V_{bias}$ before application of the refresh voltage $V_{refresh}$. When the refresh voltage pulse $V_{refresh}$ is applied, the mirror plate rotates around the contact point of the mirror plate to position and stopper 130 towards addressing electrode 126 and to position B; and deformable hinge deforms from position G to position F, resulting additional deformation (e.g. displacement d) of the deformable hinge. The additional deformation is better illustrated in FIG. 5b. As can be seen in FIG. 5b, deformable hinge 132 has an additional deformation d from position G to position F in the presence of the bias voltage having the refresh voltage pulse. Such additional deformation d is added up to the deformation of the deformable hinge established during the rotation of the mirror plate to the ON state, and thereby, increases the restoration energy with which the mirror plate departs from the ON state towards the OFF state. After application of the refresh voltage pulse and removal (or reduction in amplitude) of the bias voltage, the mirror plate is released. The mirror plate departs from the ON state under the enhanced restoration force derived from the enhanced restoration energy.

The present invention is also applicable in operations of a micromirror array device, such as the spatial light modulator in FIG. 1 having an array of micromirrors. In operation, one or more micromirrors of the array may be stuck due to in-site stiction. To repair the stuck micromirrors, refresh voltage pulses can be applied.

In accordance with an embodiment of the invention, a reparation process is carried out according to a predetermined schedule. For example, one reparation process can be performed between two consecutive frames of a sequence of frame periods in displaying a video. Alternatively, one reparation process is performed in each frame period. For another example, the reparation process can be performed in selected frame periods but preferably, at most once for each frame period. Within a frame period, the refresh process can be initiated at any time, such as at the beginning, or at the end of the frame period.

The reparation process in the embodiment comprises two consecutive refresh voltage pulses with opposite polarities and in any order. Specifically, the first refresh voltage pulse may have the polarity that is the same as or opposite to the polarity of the bias voltage immediately prior to the refresh voltage pulses. The time interval between the two consecutive voltage pulses is preferably longer than the characteristic oscillation time (e.g. the reciprocal of the resonant frequency) of the micromirror. If the micromirrors of the array have different resonant frequency, the time interval between the voltage pulses can be the reciprocal of the average resonant frequency. For example, the time interval between the two consecutive voltage pulses can be 5 times or more, or 10 times or more, or 15 times or more of the characteristic oscillation period of the micromirror.

The reparation process of the present invention can also be incorporated in other operation processes, such as bias inversion as set forth in U.S. patent application Ser. No. 10/607,687 filed Jun. 27, 2003, the subject matter being incorporated herein by reference. In operating the micromirror and devices having an array of micromirrors, it is often advantages to invert the voltage polarity so as to prevent static charge accumulation in micromirror devices, for example. The bias inversion can be achieved by inverting the polarity of the bias voltage on the deflectable mirror plate. Alternatively, the inversion process can be accomplished by inverting the polarity of the voltage difference between the deflectable mirror plate and the associated addressing electrode, as set forth in U.S. patent application Ser. No. 10/607,687 to Richards filed Jun. 27, 2003, the subject matter being incorporated herein by reference. An exemplary reparation process incorporated with bias inversion is demonstrated in FIG. 6.

Figure 6:
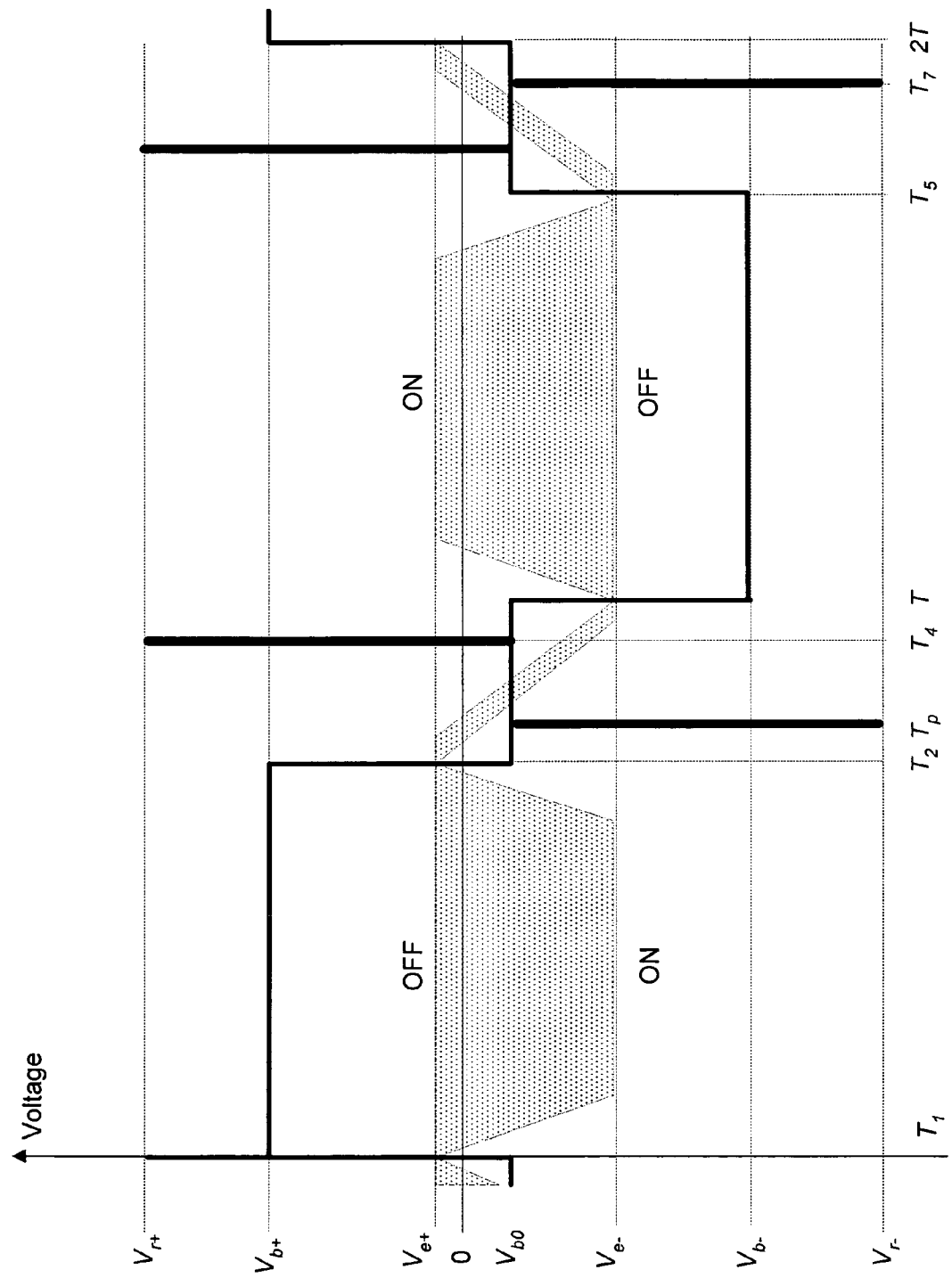
FIG. 6 diagrammatically plots voltages used in operating the micromirror device according to yet another embodiment of the invention.

Referring to FIG. 6, time is drawn in the horizontal axis; and voltage is in the vertical axis. During time period from $T_{1\ to\ T2}$, bias voltage $V_{b+}$ having a positive polarity is applied to the mirror plates of the micromirrors in the micromirror array. Voltages on the addressing electrodes of the electrode array associated with the micromirror array vary individually between $V_{e+}$ and $V_{e-}$ according to the image data of the desired image. When the voltage of an addressing electrode is $V_{e+}$, the voltage difference between voltages of the mirror plate $V_{b+}$ and the addressing electrode $V_{e+}$ is not sufficient to rotate the mirror plate to the ON state, such as the ON state in FIG. 3. When the voltage of an addressing electrode is $V_{e-}$, the mirror plate rotates to the ON state. The status of the micromirrors in the micromirror array is demonstrated in the dotted area in the figure.

At time $T_2$, the bias voltage is changed to low negative voltage $V_{b0}$, and maintained at such low negative voltage during the following transition time period from $T_2$ to T. During the transition period from $T_2$ to T, the mirror plates of the micromirrors in the array are expected to be at the OFF state for both voltages $V_{e-}$ and $V_{e+}$ with the low negative bias voltage. However, some of the mirror plates of the micromirrors in the micromirror array may experience in-site stiction, thus can not be in the OFF state. The addressing electrodes of the stuck micromirrors may be at different voltages, i.e. $V_{e+}$ and $V_{e-}$. In order to repair these stuck micromirrors, a refresh voltage pulse is applied to the micromirrors of the micromirror array at time $T_p$ during the transition period, as shown in the figure. The refresh voltage pulse has amplitude $V_{r-}$ and a negative polarity. Such refresh voltage pulse drives the stuck mirror plates towards the addressing electrodes associated with the stuck mirror plates, and causes additional deflections in the stuck micromirrors. The additional deflection, in turn, produces additional mechanical restoration energy that is added to the restoration energy stored in the deformable hinge, thus, reinforcing the total restoration energy for moving the stuck mirror plates from the in-site stiction. After application of the refresh voltage pulse, the reinforced restoration energy is released, for example, from the deformed hinge, so as to liberate the stuck mirror plate from the stiction.

At the stiction state, the addressing electrodes of some of the stuck micromirrors are at voltage $V_{e-}$ and the others are at $V_{e+}$. For the given refresh voltage pulse with particular amplitude and polarity, the voltage differences between the stuck mirror plates and associated addressing electrodes, thus the strengths of the produced additional mechanical restoration forces (torques) are different. Specifically, the voltage difference between the mirror plates and the addressing electrodes at $V_{e+}$ is larger than that between the mirror plates and the associated addressing electrodes at $V_{e-}$. As a consequence, the produced additional mechanical restoration forces, as well as the total reinforced restoration energy are also different in stuck micromirrors whose addressing electrodes are at $V_{e+}$ and $V_{e-}$. The stuck micromirrors with larger reinforced restoration energy can be liberated from the stiction; however, the micromirrors with less reinforced restoration energy may not be successfully repaired. For this reason, another refresh voltage pulse at time $T_4$ also during the transition period as shown in the figure is added to the bias voltage applied to the mirror plates so as to repair the remaining stuck micromirrors after application of the previous refresh voltage pulse. The second refresh voltage pulse at time $T_4$ has amplitude of $V_{r+}$ and a positive opposite to that of the first refresh voltage pulse, such as positive polarity. Such second refresh voltage pulse results in a larger reinforced restoration energy in those stuck micromirrors whose addressing electrodes are at $V_{e-}$ than the reinforced restoration in those stuck micromirrors whose addressing electrodes are at $V_{e+}$. Therefore, the stuck micromirrors whose addressing electrodes are at both $V_{e+}$ and $V_e$ are repaired and secured to depart from the stiction.

The two consecutive refresh pulses as discussed above can be configured and applied in many ways. For example, the first refresh voltage pulse at time $T_p$ can be applied at the ⅓ of the transition period, and the second refresh voltage pulse can be applied at the ⅔ of the transition period. On general, the two consecutive refresh voltage pulses are preferably separated in time longer than the characteristic oscillation time (the reciprocal of the resonant frequency) of the micromirrors. Specifically, the time interval between the two consecutive voltage pulses can be 5 times or more, or 10 times or more, or 15 times or more of the characteristic oscillation period of the micromirror. The peak value (amplitudes) of the refresh pulses are preferably 1.5 times or more, such as 2 times or more, 3 times or more, or 5 times or more, or 10 times or more of the amplitude of the bias voltage $V_{bias}$ before application of the refresh voltage. The duration of each of the two refresh pulses can be 5 microseconds or less, such as 2 microseconds or less and 1 microsecond or less. The two refresh pulses have opposite polarities, but can be applied to the micromirrors in any order. For example, other than applying the first pulse with the negative polarity prior to the pulse with the positive polarity as shown in the figure, the pulse with positive polarity can be applied prior to the pulse with the negative polarity.

The two refresh voltage pulses are applied to the micromirrors to repair the stuck micromirrors. However, the non-stuck micromirrors (e.g. those micromirrors at the expected OFF state during time period from $T_2$ to T) are not affected. The reparation process (i.e. application of the two consecutive refresh voltage pulses) is preferably performed at most once in each frame period of a sequence of frames. Alternatively, the reparation process can be performed for selected frame periods of a sequence of frames, while the selection can be made by the user.

At time T, the bias voltage is changed to $V_{b-}$ having a negative polarity as opposed to the bias voltage before such inversion (e.g. the bias voltage prior to $T_2$ and during time period from $T_1$ to $T_2$). During the following time period from T to $T_5$ in the following frame period, the micromirrors switches between the ON and OFF statess according to the image date of the desired image. At time $T_5$, another bias inversion process, as well as the reparation process, may be initiated but not required.

As a way of example, at time $T_5$, another bias inversion process incorporated with the reparation process is initiated, as shown in then figure. First refresh voltage pulse within transition period from $T_5$ to 2T is applied. The first refresh voltage pulse has a magnitude of $V_{r+}$ and a positive polarity. At time $T_7$, second refresh voltage pulse is applied to the micromirrors so as to secure that all stuck micromirrors whose addressing electrodes are at $V_{e-}$ or $V_{e+}$ are liberated from stiction. At time 2T, the next frame period arrives. As a way of example, table 1 lists exemplary values of the above voltages.

TABLE 1

| $V_{e+}$ (Volt) | $V_{e-}$ (Volt) | $V_{b+}$ (Volt) | $V_{b-}$ (Volt) | $V_{r+}$ (Volt) | $V_{r-}$ (Volt) | $V_{b0}$ (Volt) |
|---|---|---|---|---|---|---|
| +3.3 to +5 | −15 to −25 V | +20 to +40 V | −20 to −40 | +40 to +150 | +40 to +150 | −4 |

In another example, the bias voltages, voltages on the addressing electrodes for the ON and OFF states can be other values. As a way of example, the ON state angle of the ON state for the micromirror devices is 8° degrees or more, such as 10° degrees or more, or 12° degrees or more, or 14° degrees or more, or 16° degrees or more. The OFF state angle can be parallel to the substrate on which the mirror plate is formed, or −2° degrees or less, or −4° degrees or less. The voltage difference between the mirror plate and the addressing electrode for the mirror plate at the ON state can be 28 volts or more, such as 30 volts or more, 35 volts or more or 40 volts or more. And such voltage difference can be maintained for a time period corresponding to one least-significant-bit or more defined based on a pulse-width-modulation algorithm for producing a desired image. The voltage difference between the mirror plate and the addressing electrode for the mirror plate at the OFF state can be 17 volts or less.

The above voltage difference can be achieved in many different ways by applying different voltages to the mirror plate and the addressing electrode associated with the mirror plate. As an aspect of the embodiment of the invention, the voltage applied to the addressing electrode changes when the mirror plate switches between the ON and OFF states. In particular, the voltage on the addressing electrode may change polarity, for example, from positive to negative and vice versa. Such voltage change whether changing polarity or not, can be 10 volts or more, or 15 volts or more, or 20 volts or more, and more preferably from 13 to 25 volts.

The time duration of the applied voltage to the addressing electrode and mirror plate, may depend upon the image data of desired images according to a PWM algorithm. As an example, the duration of the applied voltages on the addressing electrode and mirror plate, as well as the voltage differences between the mirror plate and the addressing electrode (or the voltage difference between the mirror plate and the conducting film on the substrate if applicable) is 10 microseconds or more, such as 100 microseconds or more, or 400 microseconds or more, or 600 microseconds or more, or from 100 to 700 microseconds.

The voltage between the mirror plate and the addressing electrode can be can be 25 Volts or less, or more preferably 20 volts or less, or more preferably 18 volts or less, such as from 5 to 18 volts, or from 10 to 15 volts. A low operation voltage has many benefits, such as cost-effective and simplified design and fabrication, as set forth in U.S. patent application Ser. No. 10/982,259 filed Nov. 5, 2004, and U.S. patent application Ser. No. 10/340,162 filed Jan. 10, 2003, the subject matter of each being incorporate herein by reference.

Figure 7A:
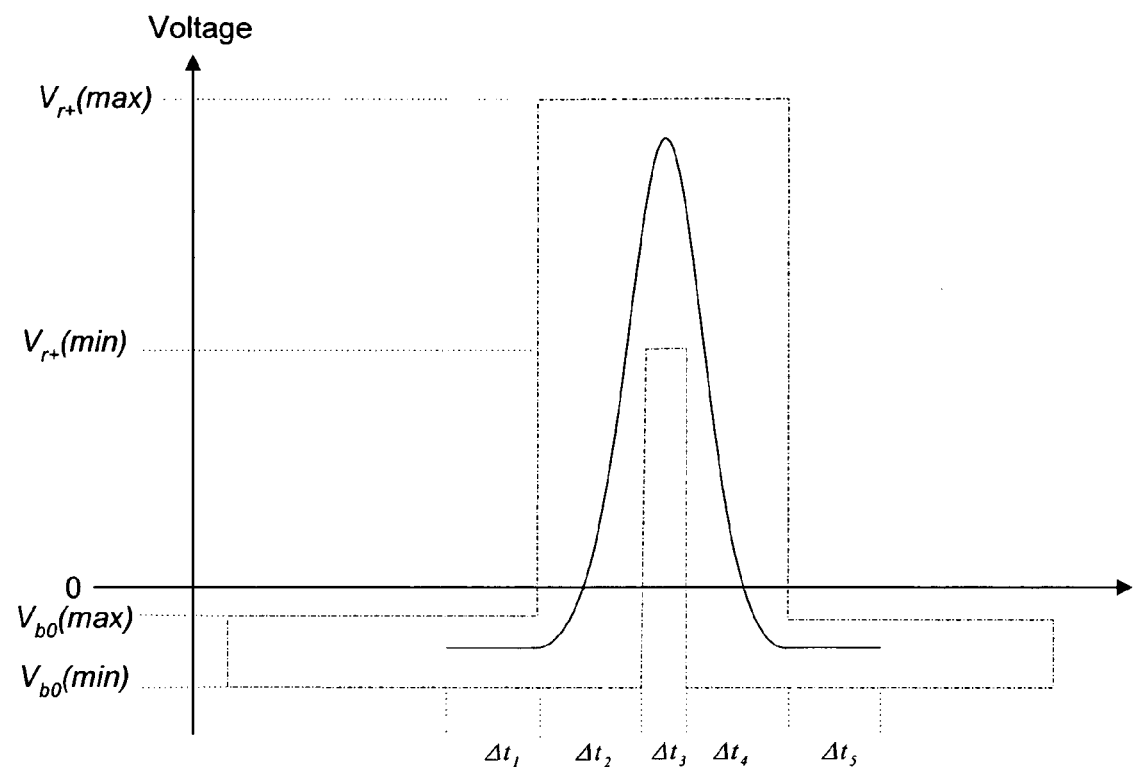
FIG. 7a diagrammatically plots first refresh pulse used in repairing the stuck micromirrors according to an embodiment of the invention.

The refresh voltage pulse as discussed above may be configured in a variety of ways. As a way of example, FIG. 7a illustrates the exploded view of an example of the refresh voltage pulse at time $T_4$ in FIG. 6. Referring to FIG. 7a, the refresh voltage pulse starts from bias voltage $V_{b0}$ during time $\Delta t_1$ with $V_{b0}$ varying between $V_{b0}(min)$ and $V_{b0}(max)$. During time $\Delta t_2$ and the first half $\Delta t_3$ ($\Delta t_2 + \frac{1}{2}\Delta t_3$), the refresh voltage increases monotonically, and reaches peak value $V_{r+}$ whose maximum and minimum values are represented by $V_{r+}(max)$ and $V_{r+}(min)$ at half $\Delta t_3$. In the following second half of $\Delta t_3$ and $\Delta t_4$, the refresh voltage pulse decreases monotonically and returns to the initial value of $V_{b0}$ at the beginning of period $\Delta t_5$.

According to the invention, the duration of the refresh pulse, that is the summation of $\Delta t_1$, $\Delta t_2$, $\Delta t_3$, $\Delta t_4$, and $\Delta t_5$, is preferably 5 microseconds or less, such as 2 microseconds or less and 1 microsecond or less. Of course, the duration of the refresh voltage pulse may have other different values. As a way of example, exemplary values of the parameters as discussed above are listed in table 2 and table 3.

TABLE 2

|  | $\Delta t_1$ | $\Delta t_2$ | $\Delta t_3$ | $\Delta t_4$ | $\Delta t_5$ |
|---|---|---|---|---|---|
| min (μs) | 0 | 0.2 | 0.5 | 0.2 | 2.0 |
| max (μs) | — | 0.5 | 1.0 | 0.5 | — |

TABLE 3

|  | $V_{b0}$ | $V_{b+}$ | $V_{b-}$ | $V_{r+}$ | $V_{r-}$ |
|---|---|---|---|---|---|
| min (V) | −4 | (20 to 40) −0.1 | (−20 to −40) +0.1 | (40 to 100) +2.5 | (−40 to −100) 5 |
| max (V) | −6 | (20 to 40) +0.1 | (−20 to −40) −0.1 | (40 to 100) +5 | (40 to 100) +2.5 |

Figure 7B:
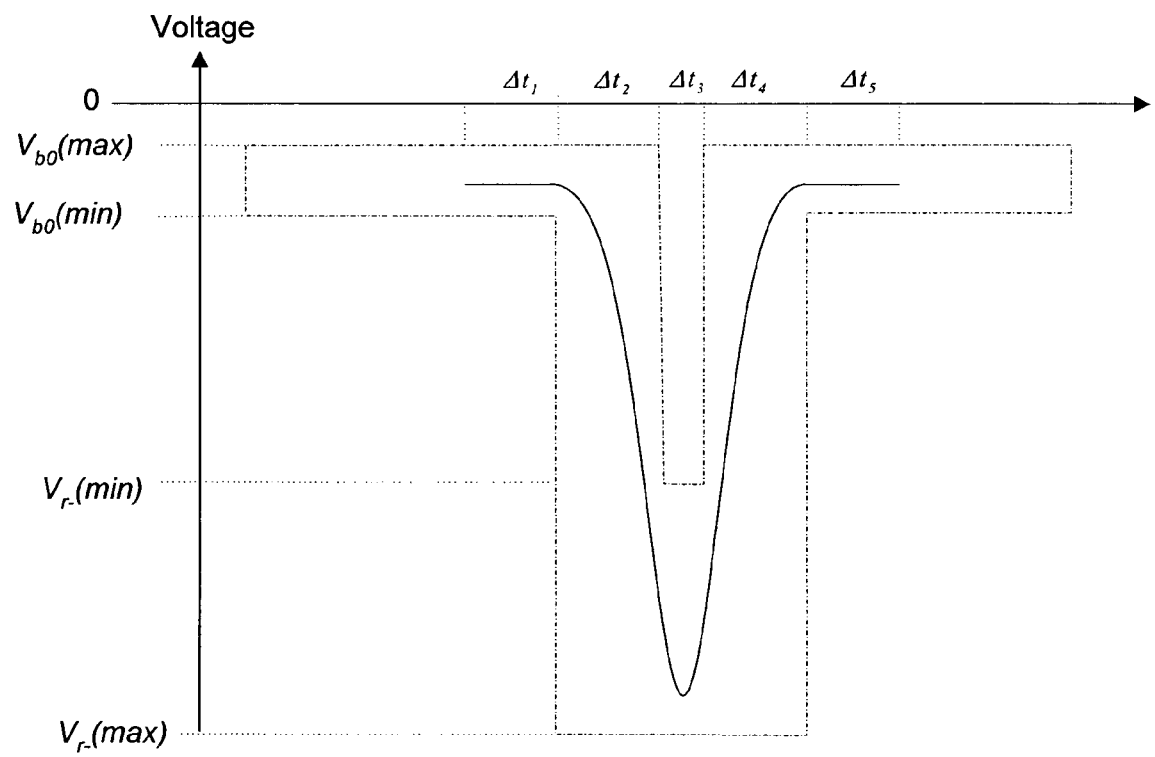
FIG. 7b diagrammatically plots second refresh pulse following the first refresh pulse in FIG. 7a used in repairing the stuck micromirrors according to the embodiment of the invention.

The exploded view of the refresh voltage pulse with a negative polarity is illustrated in FIG. 7b. Referring to FIG. 7b, the refresh voltage starts from $V_{b0}$ whose value lies within the range between $V_{b0}(min)$ and $V_{b0}(max)$. During time period $\Delta t_2$ and the first half $\Delta t_3$ ($\Delta t_2 + \frac{1}{2}\Delta t_3$), the refresh voltage decreases monotonically, and reaches the negative peak value $V_{r-}$ whose maximum and minimum values are represented by $V_{r-}(max)$ and $V_{r-}(min)$ at half $\Delta t_3$. In the following second half of $\Delta t_3$ and $\Delta t_4$, the refresh voltage pulse increases monotonically from the negative peak value and returns to the initial value $V_{b0}$ at the beginning of $\Delta t_5$.

Alternative to the reparation process as discussed with reference to FIG. 6 and FIGS. 7a and 7b where two consecutive refresh voltage pulses are provided and are applied during the transition period, the reparation process may have one single refresh voltage pulse. Such refresh voltage may have the same amplitude as any one of the above discussed two refresh voltage pulses—the pulses at time $T_p$ and $T_4$; and any polarization. However, the reparation process with one single refresh pulse may have disadvantages. As a way of example but without losing the generality, assuming the reparation process comprises one single refresh voltage pulse at time $T_p$, such single refresh voltage may only repair stick micromirrors experiencing bias inversion during time from $T_2$ to $T_p$, while can not repair the micromirrors experiencing inversion during time from $T_p$ to T. Therefore, such reparation process may not be efficient.

The reparation process with the single refresh voltage pulse may be applied at time T when all micromirrors finish the bias inversion. With this application scheme, the single refresh voltage pulse can repair all stuck micromirrors with both of the $V_{e+}$ and $V_{e-}$ voltages at the addressing electrodes, though this reparation process is less preferred.

Figure 8:
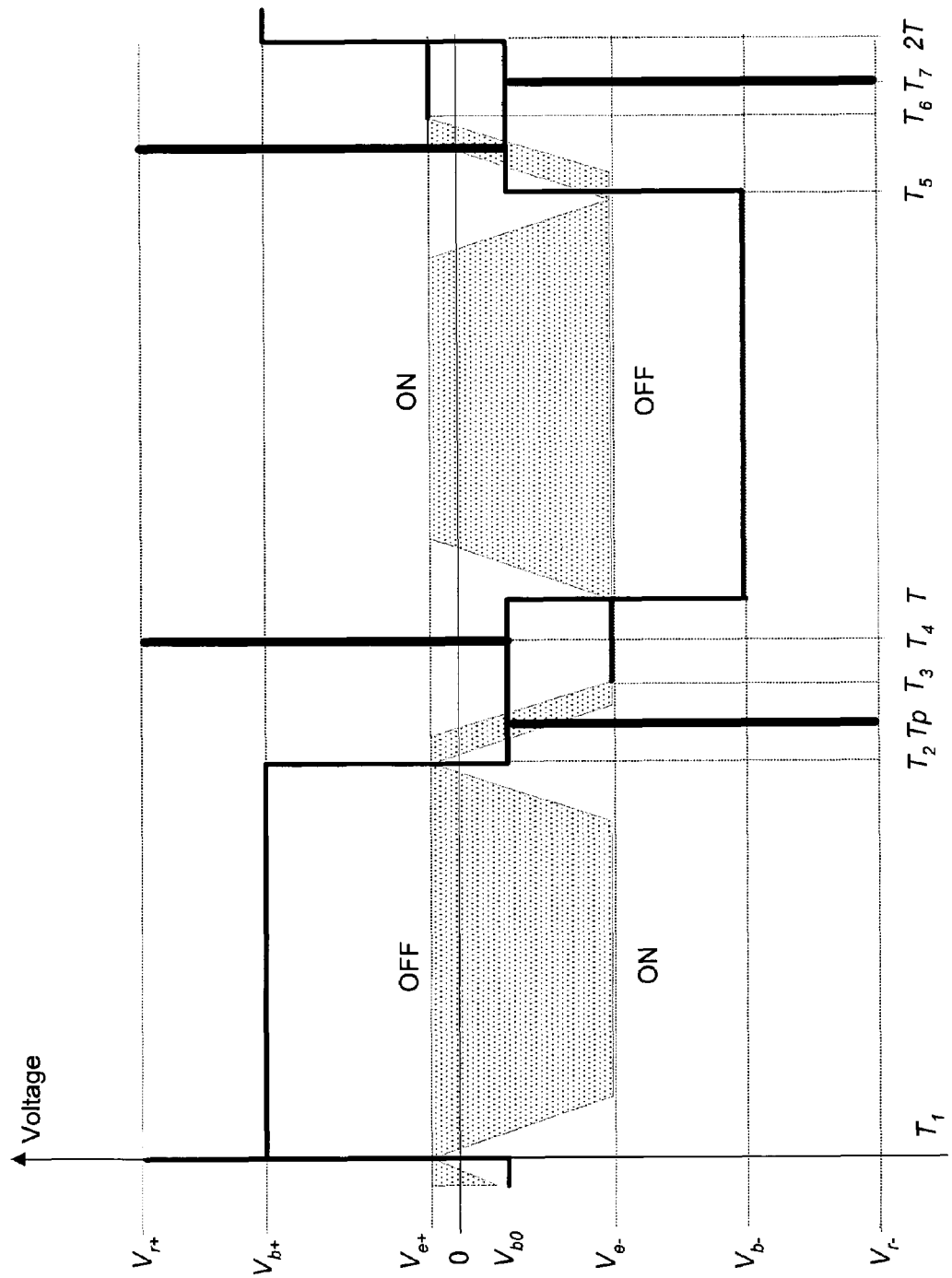
FIG. 8 diagrammatically plots voltages used in operating the micromirror device according to yet another embodiment of the invention.

Alternatively to the reparation process where the two consecutive refresh voltage pulses are applied during the transition period, an alternative reparation process having two refresh voltage pulses one of which is applied after the termination of the transition period is also applicable, as shown in FIG. 8, though less preferred.

Referring to FIG. 8, $T_2$ to $T_3$ is a transition time where the bias voltage changes from $V_{b+}$ to the low voltage $V_{b0}$. At time $T_3$, the transition is expected to be finished, wherein the addressing electrodes are at voltage $V_{e-}$ and the mirror plates are at the bias voltage of $V_{b0}$. During the transition period, the first refresh voltage pulse is applied. However, this first refresh voltage pulse is not able to repair the stuck micromirrors experiencing the micromirrors experiencing transition after the application of the first refresh voltage pulse. For this reason, in the following period from $T_3$ to T, the micromirrors are "blanked", where no image data of the desired image is fed into the micromirrors. During such blanking period, the second refresh voltage pulse is applied to repair the remaining stuck micromirrors after the application of the first refresh voltage pulse. This reparation process is less favored because the "blanking" period from $T_3$ to T can result in degradation of the brightness of the displayed image.

Alternative to the reparation process as discussed above with reference to FIG. 8, the process may also have one single refresh voltage pulse such as the refresh voltage pulse during the transition period or the refresh voltage pulse during the "blanking" period.

The refresh voltage pulse as discussed above can be applied to different micromirrors having a deflectable mirror plate and a stopping mechanism. The micromirror having a cross-section view of FIG. 3 is one of many examples. Referring again to FIG. 3, the mirror plate can be attached to the deformable hinge symmetrically or asymmetrically. When the mirror plate is attached to the deformable hinge with the attachment point substantially at or around the geometric (or mass) center of the mirror plate, the mirror plate rotates symmetrically—that is, the maximum angles achievable by the mirror plate rotating in opposite directions are substantially the same. Alternatively, when the attachment point is offset from the geometric (or mass) center of the mirror plate, the mirror plate rotates asymmetrically—that is the maximum angles achievable by the mirror plate in opposite directions are different. The asymmetric rotation of the mirror plate is more advantageous in obtaining higher contrast ratio. The ON state angle of the present invention is preferably 12° degrees or more, such as 14° degrees or more, and 14° degrees or more. The OFF state can be a state where the mirror plate is parallel to the substrate on which the mirror plates are formed, such as substrate 120. The OFF state angle can be other values, such as −1° degree or less, such as −2° degrees or less, and −4° degrees or less, wherein the minus sign "−" represents the opposite rotation direction in relation to the ON state angle. Such ON and OFF state angles can be achieved by attaching the mirror plate asymmetrically to the deformable hinge. Specifically, the hinge contact (128) contacts at the mirror plate at a location away from the geometric or mass center of the mirror plate. As a result, the deformable hinge, as well as the rotation axis is not along a diagonal of a diagonal of the mirror plate when viewed from the top of the mirror plate at the non-deflected state. Exemplary micromirrors of asymmetric rotation will be better illustrated in perspective views in FIGS. 8 to 11 afterwards.

In the cross-section view of FIG. 3, the deformable hinge and the mirror plate are in different planes. Alternatively, the mirror plate and the deformable hinge can be in the same plane. For example, the mirror plate and the deformable hinge can be fabricated or derived from a single flat substrate, such as a single crystal (e.g. single crystal silicon). Alternatively, the mirror plate and the deformable hinge can be derived from one deposited film by patterning. The stopper (e.g. stopper 130) can be in the same plane of the deformable hinge, but can also be in different planes of the deformable hinge.

In addition to the addressing electrode whose operation state (voltage) depends upon the image data of the desired image, an additional electrode for rotating the mirror plate in the direction opposite to that driven by the addressing electrode can also be provided. For example, the additional electrode can be formed on substrate 120 on which the mirror plate is formed. Alternatively, the additional electrode can be formed on the micromirror on a side opposite to the addressing electrode relative to the rotation axis of the mirror plate.

In the example as shown in FIG. 3, the deflectable mirror plates are formed on substrate 120 that is transmissive to the illumination light to be modulated, such as glass and quartz when the illumination light is visible light. The addressing electrodes and circuitry are formed on substrate 122 that can be a standard semiconductor substrate. In another embodiment of the invention, the mirror plates can be directly derived from the light transmissive substrate, such as by patterning the light transmissive substrate so as to form the deflectable mirror plate. In this instance, the deformable hinge can be single crystal or deposited thin film, which will not be discussed in detail herein. As another example, the mirror plates and the addressing electrodes can be formed on the same substrate, such as semiconductor substrate 122.

Addressing electrode 126 is preferably disposed such that the edge of the addressing electrode extending beyond the mirror plate, for example, beyond the furthest point of the mirror plate measured from the deformable hinge, so as to maximize the utilization efficiency of the electrostatic field, as set forth in U.S. patent application Ser. No. 10/947,005 filed Sep. 21, 2004, the subject matter being incorporated herein by reference. In an embodiment of the invention, each mirror plate is addressed and deflected by one single addressing electrode. In this instance, the mirror plate is rotated to the ON state by an electrostatic force derived from the electrostatic field established between the mirror plate and the addressing electrode.

Figure 9:
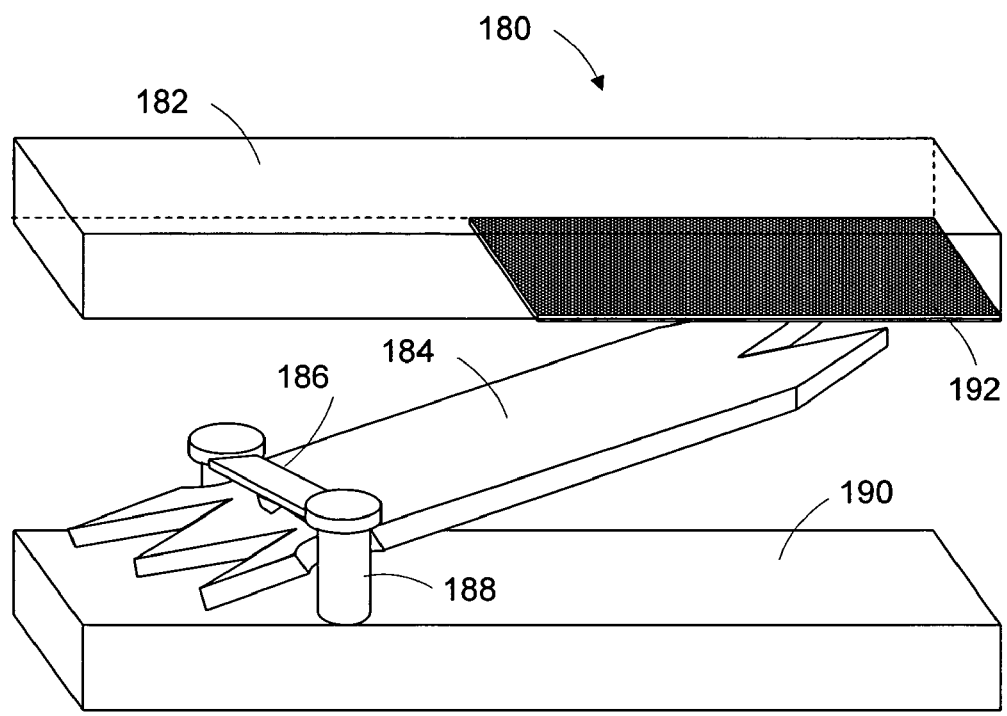
FIG. 9 is a perspective view of an exemplary micromirror device useable in the spatial light modulator of FIG. 1.

Referring to FIG. 9, a perspective view of an exemplary micromirror device in which embodiments of the invention are applicable is illustrated therein. Micromirror device 180 comprises substrate 190 that is a light transmissive substrate such as glass or quartz and semiconductor substrate 182. Deflectable and reflective mirror plate 184 is spaced apart and attached to deformable hinge 186 via a hinge contact. The deformable hinge is affixed to and held by posts 188. The semiconductor substrate has addressing electrode 192 for deflecting the mirror plate. In this particular example, the light transmissive substrate operates as a stopper for stopping the rotation of the mirror plate at the ON state.

Figure 10:
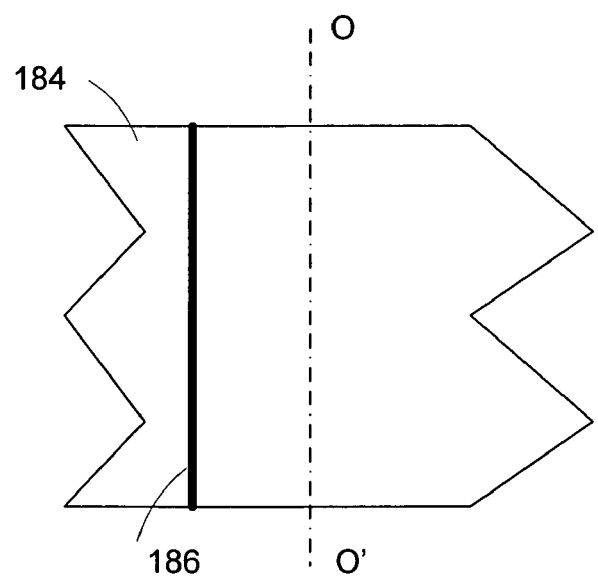
FIG. 10 schematically illustrates a top view of the deflectable mirror plate of the micromirror device of FIG. 9.

A top view of the micromirror in FIG. 9 is illustrated in FIG. 9. As can be seen in FIG. 10, deformable hinge 186 is not along but offset from the symmetrical axis OO' of the mirror plate such that the mirror plate is operable to rotate asymmetrically. The deformable hinge is located beneath the mirror plate in the direction of the incident light. That is, the mirror plate is located between the light transmissive substrate and the deformable hinge such that the deformable hinge is not illuminated by the incident light so as to prevent unexpected light scattering from the deformable hinge, thereby, increasing the contrast ratio of the produced image. The quality of the produced image is further improved through reduction of the light scattering from the edges of the mirror plate by forming the edges of the mirror plate into zigzagged shape, as shown in the figure.

Figure 11:
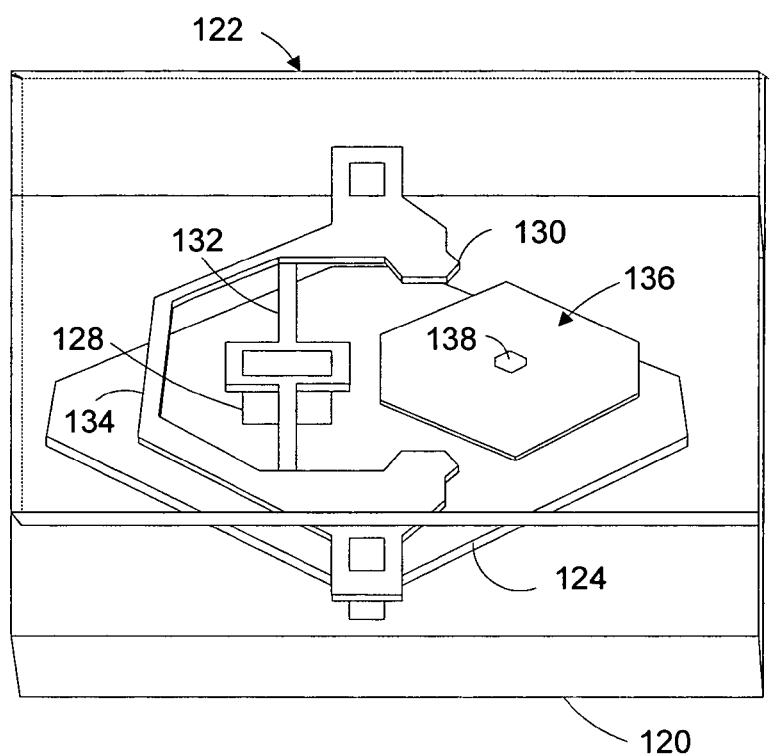
FIG. 11 is a perspective view of another exemplary micromirror device useable in the spatial light modulator of FIG. 1.

Another exemplary micromirror device having a cross-sectional view of FIG. 3 is illustrated in its perspective view in FIG. 11. Referring to FIG. 11, deflectable reflective mirror plate 124 with a substantially square shape is formed on light transmissive substrate 120, and is attached to deformable hinge 132 via hinge contact 128. The deformable hinge is held by hinge support 134, and the hinge support is affixed and held by posts on the light transmissive substrate. For electrostatically deflecting the mirror plate, an addressing electrode (not shown in the figure for simplicity purposes) is fabricated in the semiconductor substrate 122. For improving the electrical coupling of the deflectable mirror plate to the electrostatic field, extending metallic plate 136 can be formed on the mirror plate and contacted to the mirror plate via post 138.

Figure 12:
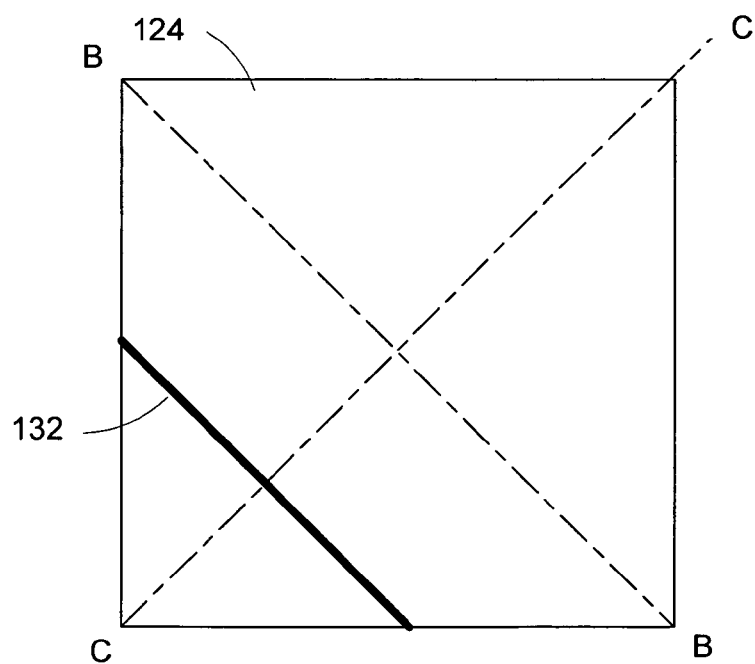
FIG. 12 schematically illustrates a top view of the deflectable mirror plate of the micromirror device of FIG. 11.

The mirror plate is preferably attached to the deformable hinge asymmetrically such that the mirror plate can be rotated asymmetrically in favor of high contrast ratio. The asymmetric attachment is better illustrated in FIG. 12. Referring to FIG. 12, mirror plate comprises diagonals BB and CC. Deformable hinge is disposed with its length parallel to a diagonal (e.g. BB) of the mirror plate. However, the length of the deformable is not along any diagonal of the mirror plate in the top view when the mirror plate is parallel to the light transmissive substrate. Of course, the mirror plate can be attached to the deformable hinge symmetrically by placing the attachment point around the geometric or mass center of the mirror plate, which will not be discussed in detail herein.

Similar to that in FIG. 9, the deformable hinge is preferably formed beneath the deflectable mirror plate in the direction of the incident light so as to avoid unexpected light scattering by the deformable hinge. For reducing unexpected light scattering of the mirror plate edge, the illumination light is preferably incident onto the mirror plate along a corner of the mirror plate.

Figure 13:
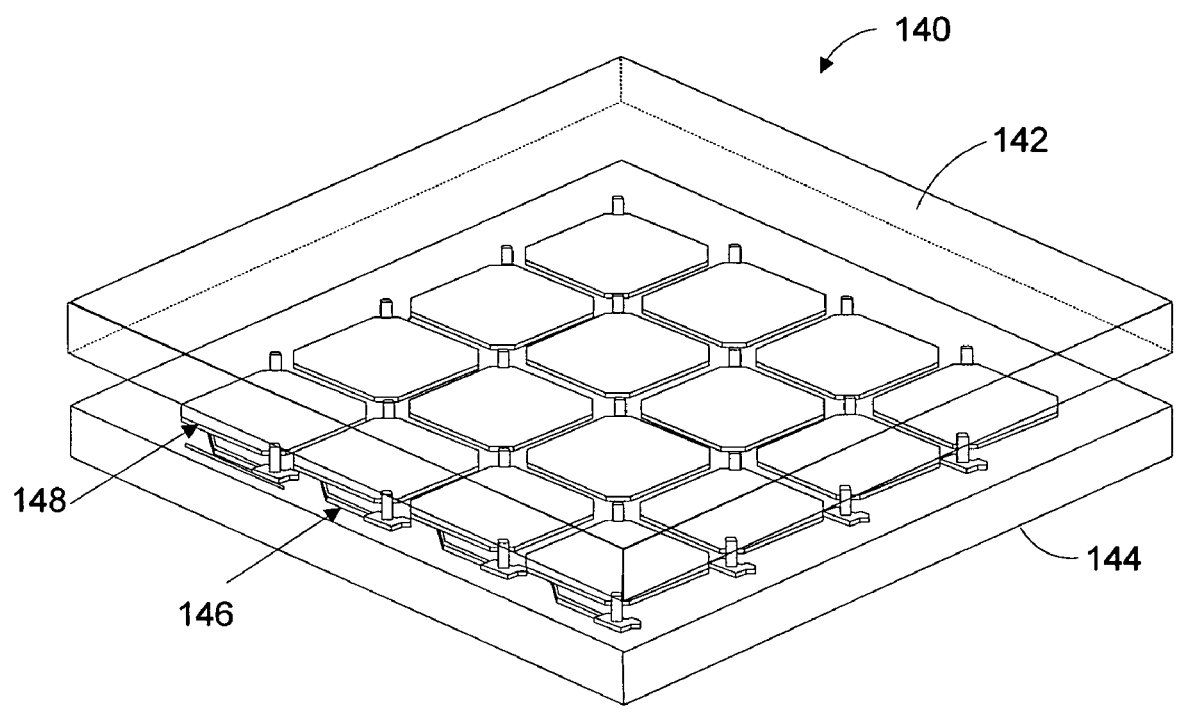
FIG. 13 is a perspective view of an exemplary spatial light modulator of FIG. 1.

Referring to FIG. 13, an exemplary spatial light modulator having an array of micromirrors of FIG. 11 is illustrated therein. For simplicity purposes, only 4×4 micromirrors are presented. In this example, micromirror array 148 is formed on light transmissive substrate 142; and addressing electrode and circuitry array 146 is formed on semiconductor substrate 144 for deflecting the micromirrors in the micromirror array. The deformable hinges of the micromirrors, as well as the addressing electrodes are hidden from the incident light.

Figure 14:
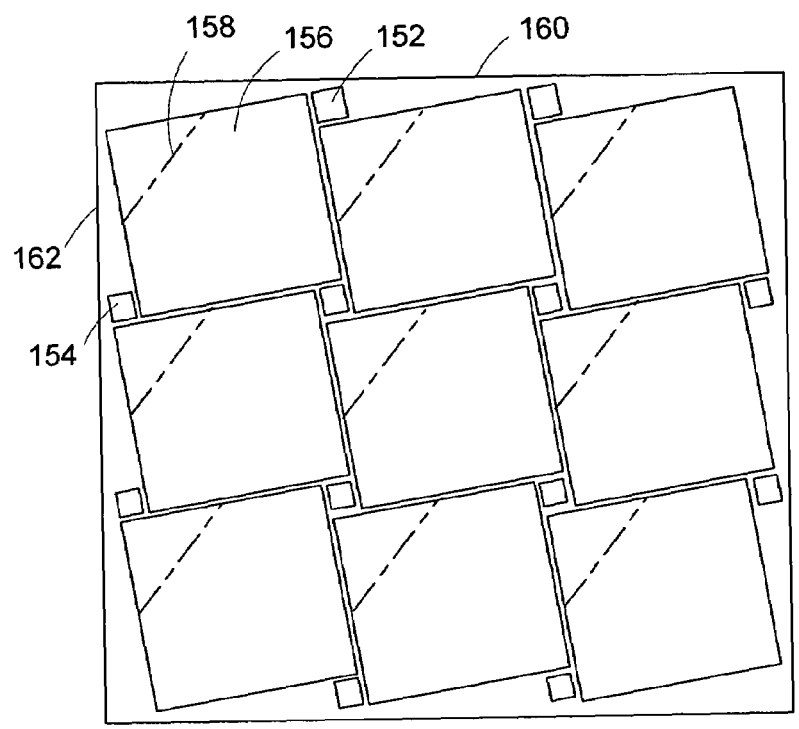
FIG. 14 is a top view of another exemplary spatial light modulator of FIG. 1.

The micromirrors in the micromirror array of the spatial light modulator can be arranged in alternative ways, another one of which is illustrated in FIG. 14. Referring to FIG. 14, each micromirror is rotated around its geometric center an angle less than 45° degrees. The posts (e.g. 152 and 154) of each micromirror (e.g. mirror 156) are then aligned to the opposite edges of the mirror plate. No edges of the mirror plate are parallel to an edge (e.g. edges 160 or 162) of the micromirror array. The rotation axis (e.g. axis 158) of each mirror plate is parallel to but offset from a diagonal of the mirror plate when viewed from the top of the mirror plate at a non-deflected state.

Figure 15:
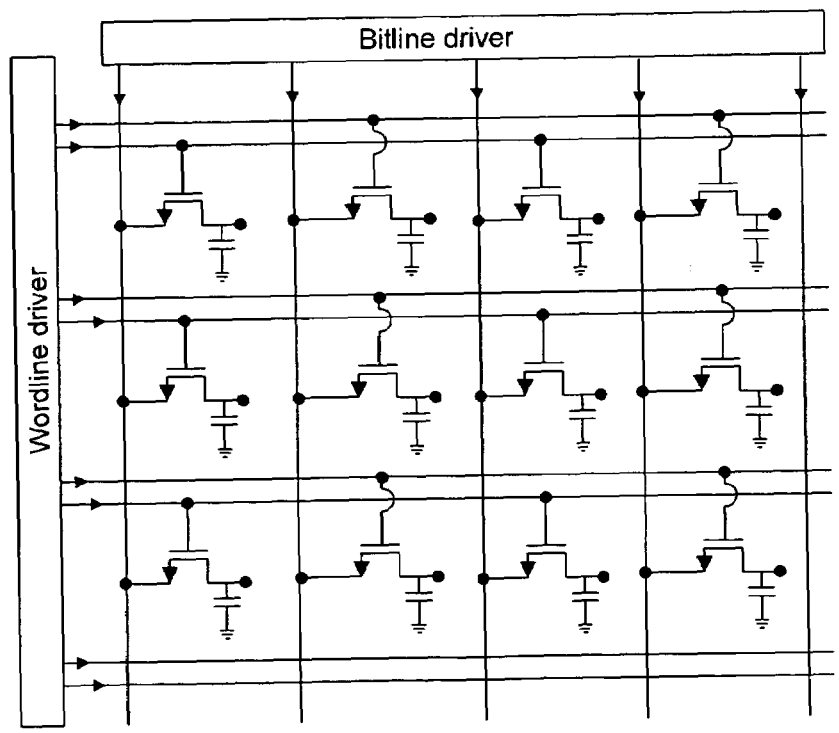
FIG. 15 schematically shows an exemplary circuitry array that is connected to an array of electrodes for deflecting the micromirrors of the spatial light modulators.

For driving the micromirrors, an array of addressing electrodes are provided and disposed proximate to the mirror plates. Each addressing electrode is connected to the voltage output node of a circuitry, such as a memory cell such that the voltage of the addressing electrode is controlled by the memory cell. An exemplary circuitry of an array of memory cells according to an embodiment of the invention is illustrated in FIG. 15. For simplicity purposes, only 3×4 memory cells are presented. In this example, each row of memory cells is connected to at least two word-lines for actuating the memory cells in the row. The memory cells can be connected to the wordlines in many different ways. For example, the memory cells can be connected to the two wordlines alternatively. With this configuration, the memory cells of each row can be actuated separately and in different times, as set forth in U.S. patent application Ser. No. 10/407,061 to Richards filed on Apr. 2, 2003, the subject matter being incorporated herein by reference. The memory cells of the memory cell array can be standard RAM and DRAM. Alternatively, the memory cells can be "charge-pump memory cells" as set forth in U.S. patent application Ser. No. 10/340,162 to Richards filed Jan. 10, 2003, the subject matter being incorporated herein by reference.

Figure 16:
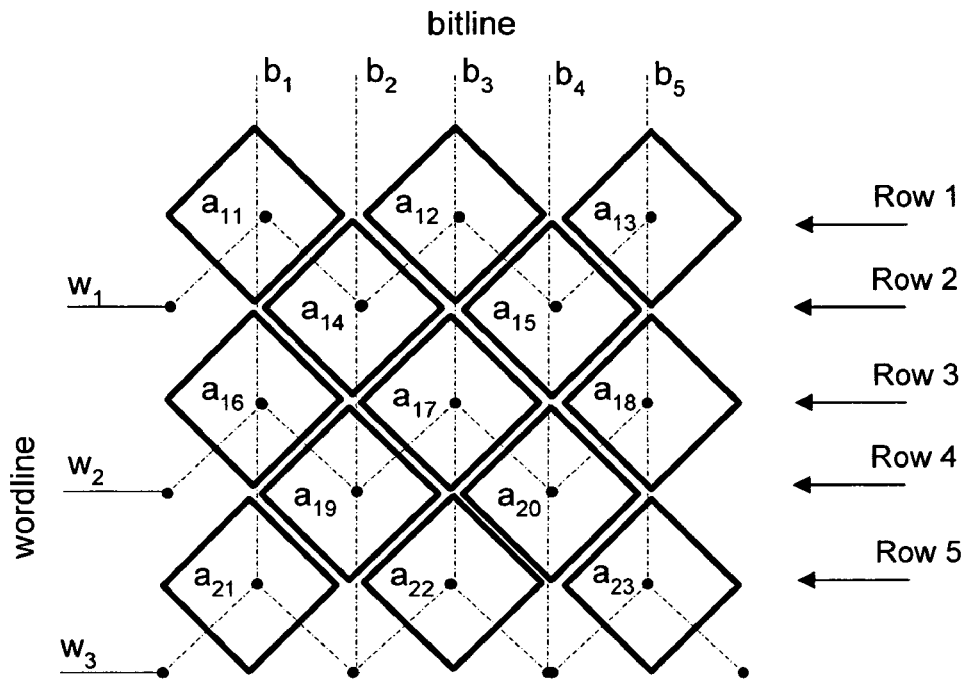
FIG. 16 schematically shows a top view of another exemplary micromirror array.

FIG. 16 illustrates the top view of another micromirror array having an array of micromirrors of FIG. 9. In this example, each micromirror is rotated 45° degrees around its geometric center. For addressing the micromirrors, the bitlines and wordlines are deployed in a way such that each column of the array is connected to a bitline but each wordline alternatively connects micromirrors of adjacent rows. For example, bitlines $b_1$, $b_2$, $b_3$, $b_4$, and $b_5$ respectively connect micromirrors groups of ($a_{11}$, $a_{16}$, and $a_{21}$), ($a_{14}$ and $a_{19}$), ($a_{12}$, $a_{17}$, and $a_{22}$), ($a_{15}$ and $a_{20}$), and ($a_{13}$, $a_{18}$, and $a_{23}$). Wordlines $w_1$, $w_2$, and $w_3$ respectively connect micromirror groups ($a_{11}$, $a_{14}$, $a_{12}$, $a_{15}$, and $a_{13}$), ($a_{16}$, $a_{19}$, $a_{17}$, $a_{20}$, and $a_{18}$), and ($a_{21}$, $a_{22}$, and $a_{23}$). With this configuration, the total number of wordlines is less the total number of bitlines.

Figure 17:
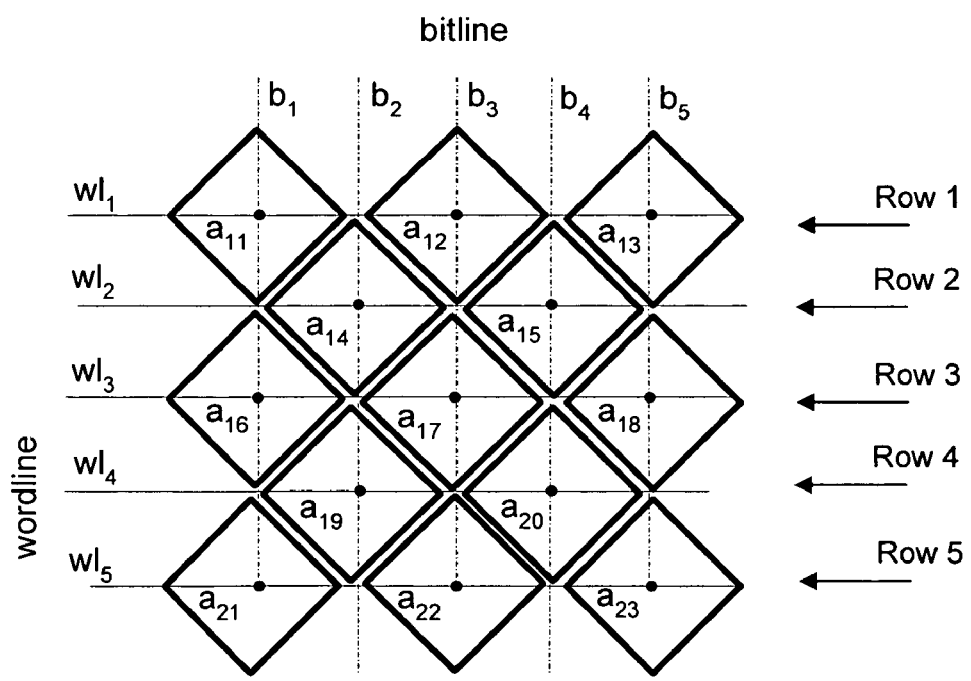
FIG. 17 schematically shows a top view of yet another exemplary micromirror array.

For the same micromirror array, the bitlines and wordlines can be deployed in other ways, such as that shown in FIG. 17. Referring to FIG. 17, each row of micromirrors is provided with one wordline and one bitline. Specifically, bitlines $b_1$, $b_2$, $b_3$, $b_4$ and $b_5$ respectively connect column 1 (comprising micromirrors $a_{11}$, $a_{16}$, and $a_{21}$), column 2 (comprising micromirrors $a_{14}$ and $a_{19}$), column 3 (comprising micromirrors $a_{12}$, $a_{17}$, and $a_{22}$), column 4 (comprising micromirrors $a_{15}$ and $a_{20}$), and column 5 (comprising micromirrors $a_{13}$, $a_{18}$, and $a_{23}$). Wordlines $WL_1$, $WL_2$, $WL_3$, $WL_4$, and $WL_5$ respectively connect row 1 (comprising micromirrors $a_{11}$, $a_{12}$, and $a_{13}$), row 2 (comprising micromirrors $a_{14}$ and $a_{15}$), row 3 (comprising micromirrors $a_{16}$, $a_{17}$, and $a_{18}$), row 4 (comprising micromirrors $a_{19}$ and $a_{20}$) and row 5 (comprising micromirrors $a_{21}$, $a_{22}$, and $a_{23}$).

Figure 18A:
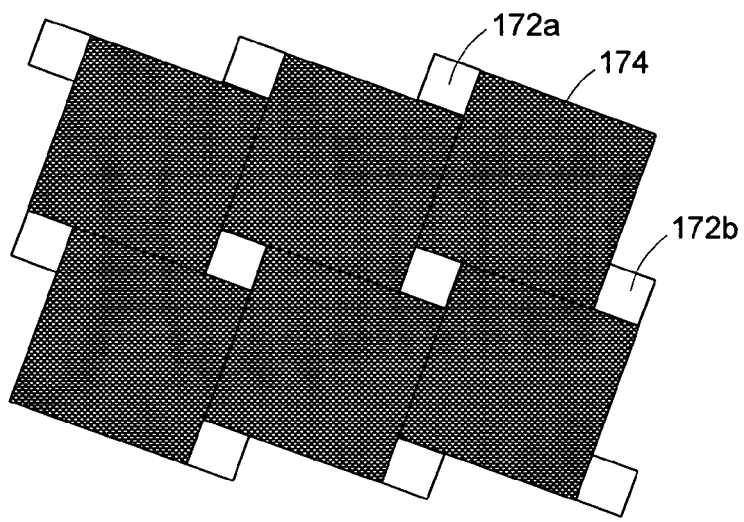
FIGS. 18a to 19 schematically show a top view of another exemplary micromirror array device comprising an array of electrodes and circuitry and micromirrors.
Figure 18B:
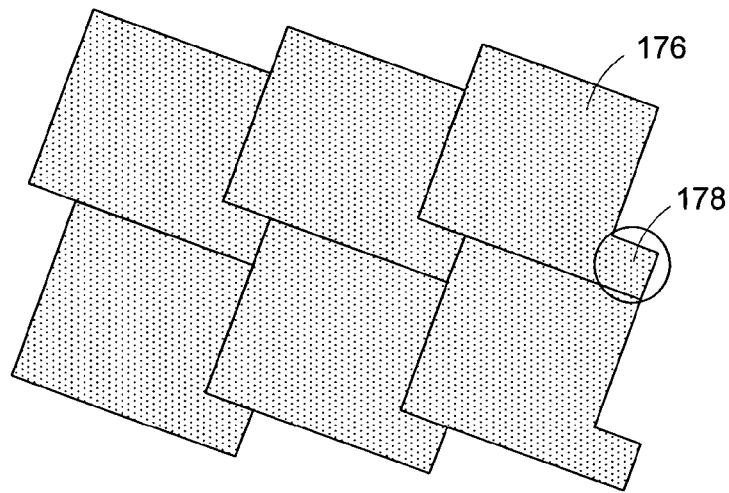
Figure 19:
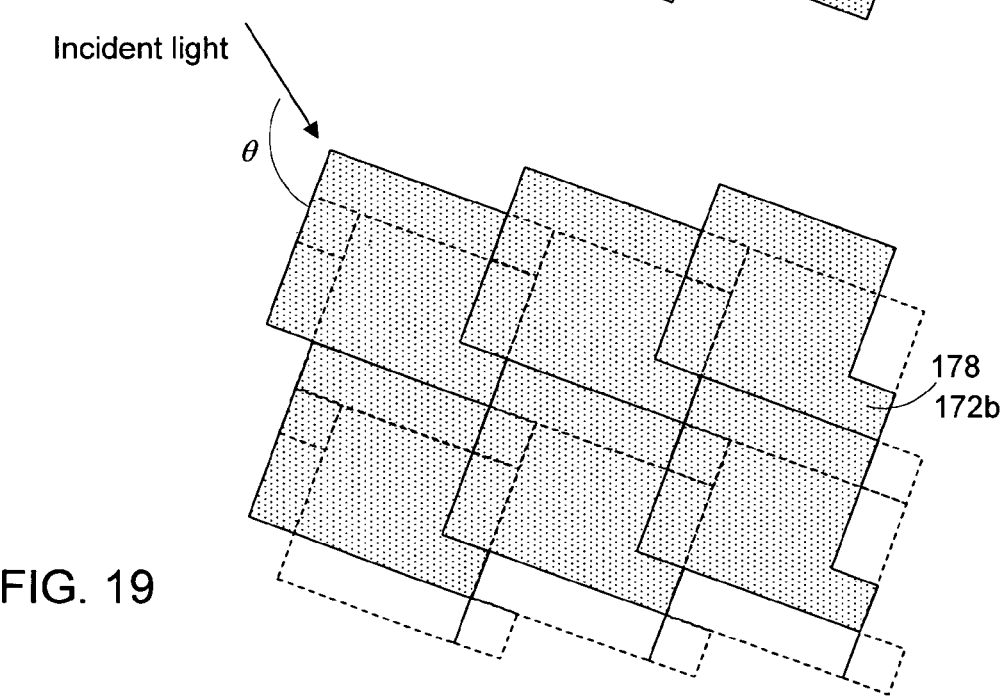

According to another embodiment of the invention, the mirror plates of the micromirrors in the array can form a plurality of pockets, in which posts can be formed, wherein the pockets are covered by the extended areas of the addressing electrodes when viewed from the top of the micromirror array device, as shown in FIGS. 18a to 19.

Referring to FIG. 18a, a portion of an array of mirror plates of the micromirrors is illustrated therein. The mirror plates in the array form a plurality of pockets in between. For example, pockets 172a and 172b are formed in which posts for supporting and holding mirror plate 174 can be formed. For individually addressing and deflecting the mirror plates in FIG. 18a, an array of addressing electrodes is provided, a portion of which is illustrated in FIG. 18b.

Referring to FIG. 18b, each addressing electrode has an extended portion, such as extended portion 178 of addressing electrode 176. Without the extended portion, the addressing electrode can be generally square, but having an area equal to or smaller than the mirror plate.

FIG. 19 illustrates a top view of a micromirror array device after the addressing electrodes in FIG. 17b and the mirror plates in FIG. 18a being assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

When used in a spatial light modulator of a display system as shown in FIG. 1, the incident light beam is directed onto the mirror plates in a direction along the displacement direction of the addressing electrodes when viewed from the top of the addressing electrodes as shown in the figure. For example, the incident light has an angle θ to an edge of the addressing electrode (or the mirror plate) when viewed from the top; and the angle can be 135° degrees.

The micromirrors in which embodiments of the invention can be implemented may be composed of any suitable materials and fabricated in many ways. According to the invention, the deflectable mirror plate comprises reflective film, preferably composed of a metallic material (e.g. aluminum, gold, silver) having a high reflectivity, deposited on another non-metallic material, such as $SiO_x$, $SiN_x$ and $TiN_x$, for enhancing the mechanical properties of the mirror plate. Alternatively, other materials, such as a barrier layer for preventing diffusion between the metallic reflecting layer and the mechanical enhancing layer, can be deposited between the metallic reflecting layer and the mechanical enhancing layer.

The deformable hinge preferably comprises an electrically conductive layer. Examples of suitable materials for the hinge layer are Al, Ir, titanium, titanium nitride, titanium oxide(s), titanium carbide, $TiSiN_x$, $TaSiN_x$, or other ternary and higher compounds.

Figure 20:
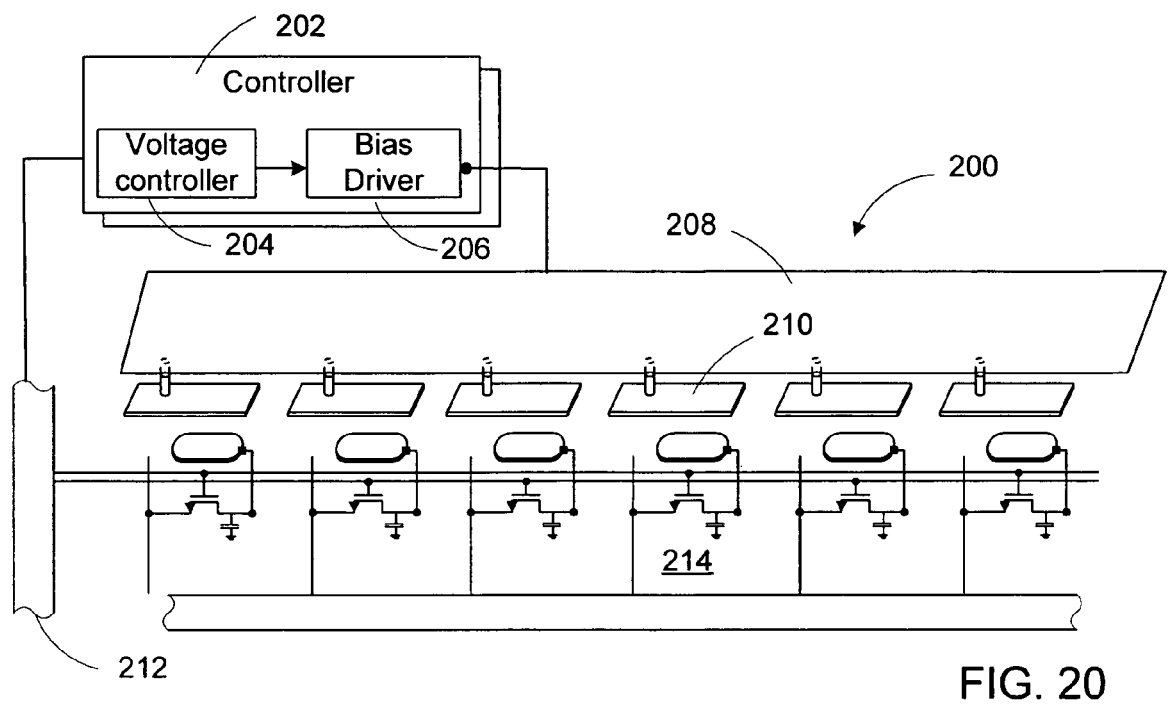
FIG. 20 schematically illustrates circuits in which embodiments of the invention can be implemented.

The embodiments of the present invention can be implemented in hardware devices, such as integrated circuits either analog or digital, such as bias driver 206 of controller 202 in FIG. 20. Referring to FIG. 20, controller 202, which further comprises voltage controller 204, is a controlling unit that controls the voltages on the mirror plates and electrodes. Specifically, the controller selectively activates memory cells (e.g. memory cell 214) in response to activation signals and sets the selected memory cells into desired voltage states. The electrodes connected to the selected memory cells are accordingly set to desired voltages for driving the mirror plate to rotate. Bias driver 206 controls applications of the voltages to the mirror plates and electrodes. In particular, bias driver 206 may perform the application of the refresh voltage pulses of reparation processes and invention process of inverting polarity of voltage differences across mirror plates and electrodes in accordance with a predetermined procedure.

Figure 21:
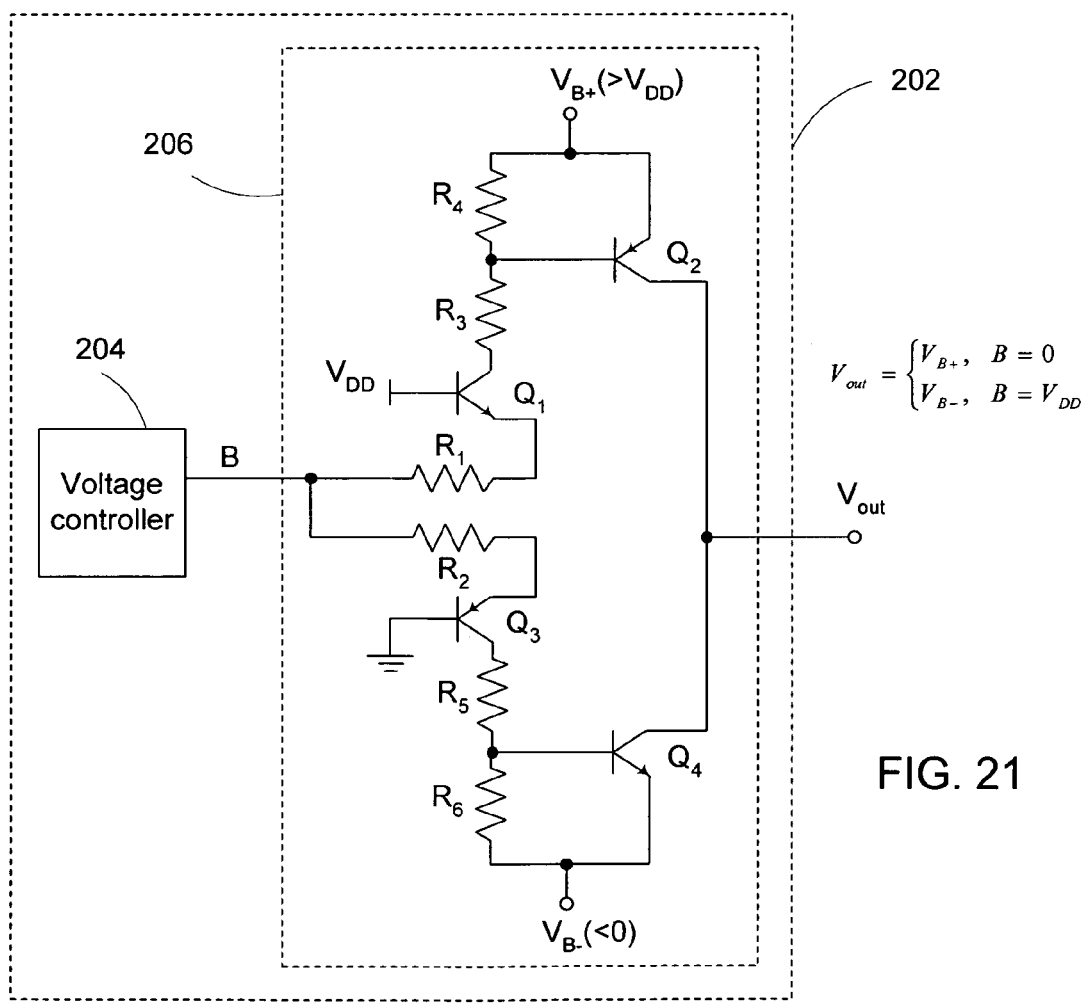
FIG. 21 illustrates an exemplar circuits for controlling the voltages applied to the micromirrors.

As a way of example, FIG. 21 illustrates a circuit design for the bias driver of FIG. 20. As can be seen from the figure, the design is composed of transistors $Q_1$, $Q_2$, $Q_3$ and $Q_4$, and resistors $R_1$, $R_2$, $R_3$, $R_4$, $R_5$ and $R_6$. The source of transistor $Q_2$ and one end of resistor $R_4$ form a voltage node $V_{B+}$. The drain of transistor $Q_4$ and one end of resistor $R_6$ form another voltage node $V_{B-}$. The gate of transistor $Q_1$ is set to voltage $V_{DD}$. In this particular circuit design, the output voltage $V_{out}$ from bias driver 206 depends upon the output signal B from voltage controller 204. Specifically, the $V_{out}$ of bias driver 160 is VB+(larger than $V_{DD}$) when the output signal B of the voltage controller is set to 0. And the output voltage $V_{out}$ is $V_B$ (less than zero) when the output signal B of the voltage controller is set to $V_{DD}$. FIG. 21 shows an exemplary circuit design for the bias driver and the controller of FIG. 20. In fact, the controller and the bias driver can be any suitable circuit design as long as they provide electric voltages to the mirror plate and/or the electrode and invert the polarity of the voltage difference between the mirror plate and the electrode.

Other than implementing the embodiments of the present invention in controller 202, the embodiments of the present invention may also be implemented in a microprocessor-based programmable unit, and the like, using instructions, such as program modules, that are executed by a processor. Generally, program modules include routines, objects, components, data structures and the like that perform particular tasks or implement particular abstract data types. The term "program" includes one or more program modules. When the embodiments of the present invention are implemented in such a unit, it is preferred that the unit communicates with the controller, takes corresponding actions to signals, such as actuation signals from the controller, and inverts polarity of the voltage differences.

It will be appreciated by those skilled in the art that a new and useful method and apparatus for transposing pixel data matrices into bitplane data matrices for use in display systems having micromirror arrays have been described herein. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof. In the claims, only elements denoted by the words "means for" are intended to be interpreted as means plus function claims under 35 U.S.C. §112, the sixth paragraph.

We claim:

1. A method of operating a device comprising an array of micromirrors, each comprising a mirror plate and an addressing electrode, the method comprising:
   switching the micromirrors between an ON and OFF state;
   applying a number of refresh voltage pulses to the mirror plates so as to repair a stuck micromirror; and
   wherein a ratio of the number of switches of the micromirrors between the ON and OFF states to the number of refresh voltage pulses is greater than 1.

2. The method of claim 1, wherein the step of switching the micromirrors between the ON and OFF states further comprises:
   applying a bias voltage to the mirror plates of the micromirrors and a set of voltages to the addressing electrodes, wherein the voltages on the addressing electrodes are determined according to a set of image data produced from an image using a pulse-width-modulation technique.

3. The method of claim 2, further comprising:
   applying the bias voltage to the mirror plate and a voltage to the addressing electrode associated with said mirror plate such that the mirror plate is rotated to an ON state angle of 10° degrees or more from a non-deflected state, wherein the difference between said two voltages is 30 volts or more.

4. The method of claim 3, wherein the ON state angle is 12° degrees or more relative to the non-deflected state.

5. The method of claim 3, further comprising: adjusting at least one of the applied bias voltage and the voltage on the addressing electrode such that the voltage difference between the mirror plate and addressing electrode is 17 volts or less.

6. The method of claim 3, wherein the voltage on the addressing electrode changes 10 volts or more when the mirror plate switches between the ON and OFF states.

7. The method of claim 6, wherein the change of the voltage on the addressing electrode is from 13 to 25 volts when the mirror plate switches between the ON and OFF states.

8. The method of claim 1, wherein the step of applying a set of refresh voltage pulses further comprises:
   performing a reparation process that comprises first and second refresh voltage pulses for the micromirrors, wherein the first and second refresh voltage pulses are spaced in time longer than the intrinsic oscillation time of the micromirror.

9. The method of claim 8, wherein the reparation process further comprises:
   adjusting the bias voltage and the voltages on the addressing electrodes such that the micromirrors are expected to be in the OFF state; and
   applying the first and second refresh voltage pulses to repair a stuck micromirror in the ON state.

10. The method of claim 8, wherein the reparation process is performed at most once during each frame period of a sequence of frames.

11. The method of claim 8, wherein the reparation process is performed during selected frames of the sequence of frames.

12. The method of claim 10, wherein the reparation process is performed at the end of the frame period.

13. The method of claim 8, wherein the reparation process is performed during a spoke time period intervening two of a sequence of color field periods.

14. The method of claim 13, wherein the first and second refresh pulses of the reparation process have opposite polarities.

15. The method of claim 14, wherein the polarization of the first refresh voltage pulse is opposite to the polarity of the bias voltage.

16. The method of claim 1, wherein the mirror plate comprises a metallic reflecting layer and a non-metallic layer, and each mirror plate is attached to a deformable hinge that comprises an electric conductive layer and a non-metallic layer; and wherein the deformable hinge deforms under the refresh voltage pulses so as to produce a restoration energy when the mirror plate is at the OFF state.

17. The method of claim 8, further comprising:
changing the polarity of the bias voltage.

18. The method of claim 17, further comprising:
changing the bias voltage from first value to second value, wherein the micromirror is expected to be at the OFF state with the second value of the bias voltage;
maintaining the bias voltage at the second value for a transition time period where the mirror plates at the ON state are expected to be at the OFF state; and
performing the reparation process during said transition time period.

19. The method of claim 8, wherein the reparation process lasts for a time period of 10 microseconds or less.

20. The method of claim 8, wherein the reparation process lasts for a time period of 1 microsecond or less.

* * * * *